US012230929B2

(12) United States Patent
Deng

(10) Patent No.: US 12,230,929 B2
(45) Date of Patent: Feb. 18, 2025

(54) ELECTRIC CONNECTING PART AND DATA CABLE

(71) Applicant: Shenzhen Ke Xiu Technology Co., Ltd., Shenzhen (CN)

(72) Inventor: Shuyuan Deng, Shenzhen (CN)

(73) Assignee: Shenzhen Ke Xiu Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/648,392

(22) Filed: Apr. 28, 2024

(65) Prior Publication Data

US 2024/0283205 A1 Aug. 22, 2024

Related U.S. Application Data

(63) Continuation of application No. PCT/CN2020/118195, filed on Sep. 27, 2020.

(30) Foreign Application Priority Data

Apr. 15, 2020 (CN) ......................... 202020573316.0
Jun. 29, 2020 (CN) ......................... 202021249444.6

(Continued)

(51) Int. Cl.
*H01R 35/04* (2006.01)
*H01R 13/62* (2006.01)
*H01R 13/66* (2006.01)

(52) U.S. Cl.
CPC ......... *H01R 35/04* (2013.01); *H01R 13/6205* (2013.01); *H01R 13/665* (2013.01)

(58) Field of Classification Search
CPC ............................ H01R 35/04; H01R 13/6205
See application file for complete search history.

(56) References Cited

U.S. PATENT DOCUMENTS 4,026,618 A * 5/1977 Straka .................... H01R 39/00 439/21
4,643,508 A * 2/1987 Schaller ................. H01R 35/04 439/31

(Continued)

FOREIGN PATENT DOCUMENTS

CN 203522258 U 4/2014
CN 212114824 U 12/2020

*Primary Examiner* — Thanh Tam T Le
(74) *Attorney, Agent, or Firm* — Andrew C. Cheng

(57) ABSTRACT

The present disclosure provides a electric connecting part and a Data cable. The electric connecting part comprising an adapter plate and a terminal head, conducting sheets are arranged on the adapter plate, the conducting sheets are electrically connected to the terminal head, each conduction sheet includes an arc-shaped structure, the adapter plate includes two main surfaces arranged opposite to each other, the conducting sheets are arranged on one or on two main surfaces of the adapter plate, the arc-shaped structure of the conduction sheets is used to enable rotation of the second connecting part relative to the adapter plate equal to or less than 180 degrees. The Data cable comprising a second connecting part and the electric connecting part, the second connecting part is configured to be connected to a line body. Therefore, the electric connecting part and the Data cable are convenient to use and unlikely to damage.

13 Claims, 19 Drawing Sheets

(30) Foreign Application Priority Data

| | | |
|---|---|---|
| Jul. 6, 2020 | (CN) | 202021310259.3 |
| Jul. 13, 2020 | (CN) | 202021373039.5 |
| Aug. 17, 2020 | (CN) | 202021736527.8 |
| Aug. 24, 2020 | (CN) | 202021790498.3 |

(56) References Cited

U.S. PATENT DOCUMENTS

| | | | | |
|---|---|---|---|---|
| 6,786,734 | B2 * | 9/2004 | Yu | H01R 35/02 439/31 |
| 6,893,267 | B1 * | 5/2005 | Yueh | H01R 35/04 439/954 |
| 7,614,903 | B1 * | 11/2009 | Huang | H01R 13/5841 439/446 |
| 7,811,136 | B1 * | 10/2010 | Hsieh | H01R 24/60 439/31 |
| 8,157,569 | B1 * | 4/2012 | Liu | H01R 35/04 439/11 |
| 8,651,874 | B2 * | 2/2014 | Ku | H01R 35/02 439/31 |
| 8,777,671 | B2 * | 7/2014 | Huang | H01R 35/04 439/11 |
| 9,385,464 | B2 * | 7/2016 | Wu | H01R 27/00 |
| 11,101,584 | B2 * | 8/2021 | Tan | H01R 35/04 |
| 11,502,467 | B2 * | 11/2022 | Deng | H01R 13/6205 |

* cited by examiner

ELECTRIC CONNECTING PART AND DATA CABLE

TECHNICAL FIELD

The present disclosure relates to the technical field of electronic accessories, and more particularly relates to a Data cable.

BACKGROUND OF THE INVENTION

When an existing Data cable is used, a part close to a male connector cannot be rotated to adjust an angle and is thus likely to bend, resulting in inconvenience to use and easy damage to a connection part close to the male connector, thereby affecting the service life of the Data cable.

SUMMARY OF THE INVENTION

In order to overcome the problem that the male connector of the current Data cable cannot be rotated to adjust an angle, the present disclosure provides a Data cable.

In order to solve the above technical problem, the present disclosure provides the following technical solution: a electric connecting part, wherein the electric connecting part comprising an adapter plate and a terminal head, the adapter plate is electrically connected to the terminal head, conducting sheets are arranged on the adapter plate, the conducting sheets are electrically connected to the terminal head, the conduction sheets are used to receive external signals, each conduction sheet includes an arc-shaped structure, the adapter plate includes two main surfaces arranged opposite to each other, the conducting sheets are arranged on one main surface or on the two main surfaces of the adapter plate, the arc-shaped structure of the conduction sheets is used to enable rotation of the second connecting part relative to the adapter plate equal to or less than 180 degrees.

In order to solve the above technical problem, the present disclosure provides the following technical solution: a data cable comprising a second connecting part and the electric connecting part as described above, the second connecting part is configured to be connected to a line body; the second connecting part comprises a fixed core, and at least one first conducting connection sheet and at least one second conducting connection sheet which are arranged on the fixed core; the fixed core is provided with a through groove for the adapter plate to be inserted; when the adapter plate is rotatably connected to the fixed core through the rotating shaft, the first and second conducting connection sheets are electrically connected to the adapter plate to realize charging and/or data transmission.

Compared with the prior art, the Electric connecting part and the Data cable of the present disclosure has the following advantages.

1. The Electric connecting part
2. The present disclosure provides a Data cable which includes a electric connecting part, a second connecting part and a rotating shaft, wherein the rotating shaft passes through the electric connecting part and the second connecting part and is connected to the electric connecting part and the second connecting part, so that the electric connecting part and the second connecting part can rotate around the rotating shaft. The electric connecting part is configured to be connected to an electronic apparatus, the electronic apparatus including, but not limited to, an electronic device or a magnetically attractable plug-in terminal. By means of the rotation design of the electric connecting part and the second connecting part, when the electric connecting part and the second connecting part are directly or indirectly connected to an external device, the relative angle between the electric connecting part and the second connecting part can be adjusted according to needs, such that the external device can be easily switched in different positions and postures in a connected state, thereby reducing a bending force at the connection part. Therefore, the Data cable is convenient to use and unlikely to damage.

DETAILED DESCRIPTION OF THE INVENTION

In order to make the objectives, technical solutions, and advantages of the present disclosure clearer, the present disclosure is further described in detail below with reference to the accompanying drawings and embodiments. It should be understood that the specific embodiments described herein are only used to explain the present disclosure and are not used to limit the present disclosure.

It should be also noted that when a component is referred to as "being fixed to" the other component, the component may be directly disposed on the other component, or there may be an intermediate component. When a component is referred to as "being connected with" the other component, the component may be directly connected to the other component, or there may be an intermediate component concurrently. The terms "vertical", "horizontal", "left", "right" and the like used in the present disclosure are for illustrative purposes only.

Figure 1:
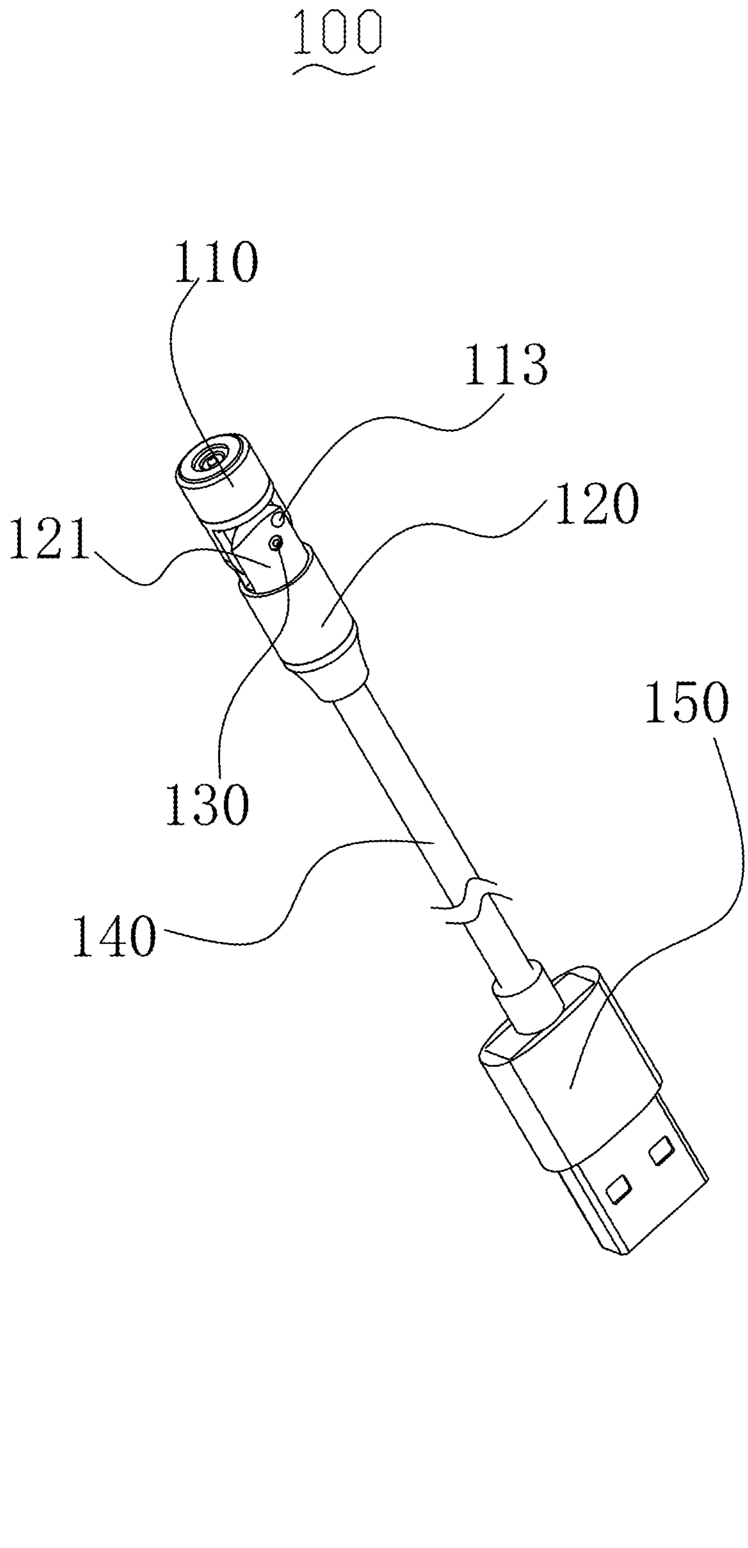
FIG. 1 is a schematic perspective diagram of a Data cable provided by a first embodiment of the present disclosure.

Referring to FIG. 1, a first embodiment of the present disclosure provides a Data cable 100. The Data cable 100 includes a electric connecting part 110, a second connecting part 120 and a rotating shaft 130. The electric connecting part 110 therein may also be referred to as "the first connecting part 120". The rotating shaft 130 passes through the electric connecting part 110 and the second connecting part 120 and is connected to the electric connecting part 110 and the second connecting part 120, such that the electric connecting part 110 and the second connecting part 120 can rotate around the rotating shaft 130. The electric connecting part 110 is configured to be connected to an electronic apparatus, which includes, but is not limited to, a portable electronic device, or a magnetically attractable plug configured to plug into the electronic device. By means of the rotation design of the electric connecting part 110 and the second connecting part 120, when the electric connecting part 110 and the second connecting part 120 are directly or indirectly connected to an external device, the relative angle between the electric connecting part 110 and the second connecting part 120 can be adjusted according to needs, such that the external device can be easily switched in different positions and postures in a connected state, thereby reducing a bending force at the connection part. Therefore, the Data cable is convenient to use and unlikely to damage.

In some embodiments, the electric connecting part 110 is configured to plug into a socket of an external electronic device. The electric connecting part 110 includes any one of a type-c terminal, a micro-usb terminal, or a lightning terminal, and can be conveniently connected to the external electronic device. Alternatively, in other embodiments, the electric connecting part 110 is a magnetically attractable plug, which may be used for magnetic connection with an external connector plugged in the electronic device and which is convenient to connect and disconnect.

The Data cable 100 further includes a line body 140 and a connector 150. The line body 140 is electrically connected to one end of the second connecting part 120 away from the electric connecting part 110. The connector 150 is electrically connected to one end of the line body 140 away from the second connecting part 120. By connecting the line body 140 to the connector 150 and then to the external device, a bending force suffered by the Data cable 100 when connected to the external device can be further reduced.

In some specific embodiments, the connector 150 includes a USB plug connector.

Referring to FIG. 1 again, the electric connecting part 110 is provided with an indicator light 113 inside. The indicator light 113 may be configured to determine whether the second connecting part 120 is electrified or not.

Figure 2:
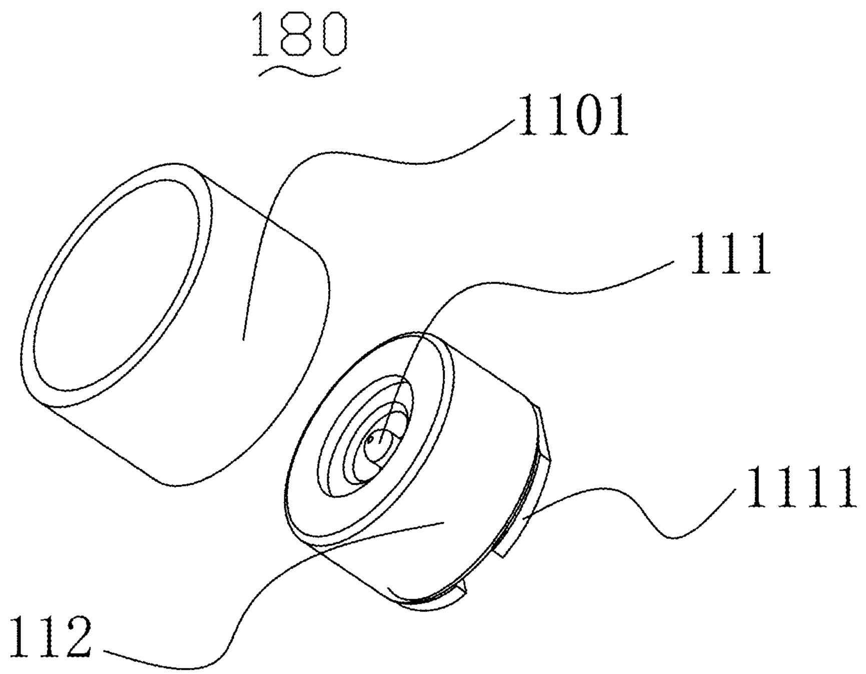
FIG. 2 is a partial exploded view of a connecting part in the first embodiment of the present disclosure.
Figure 2A:
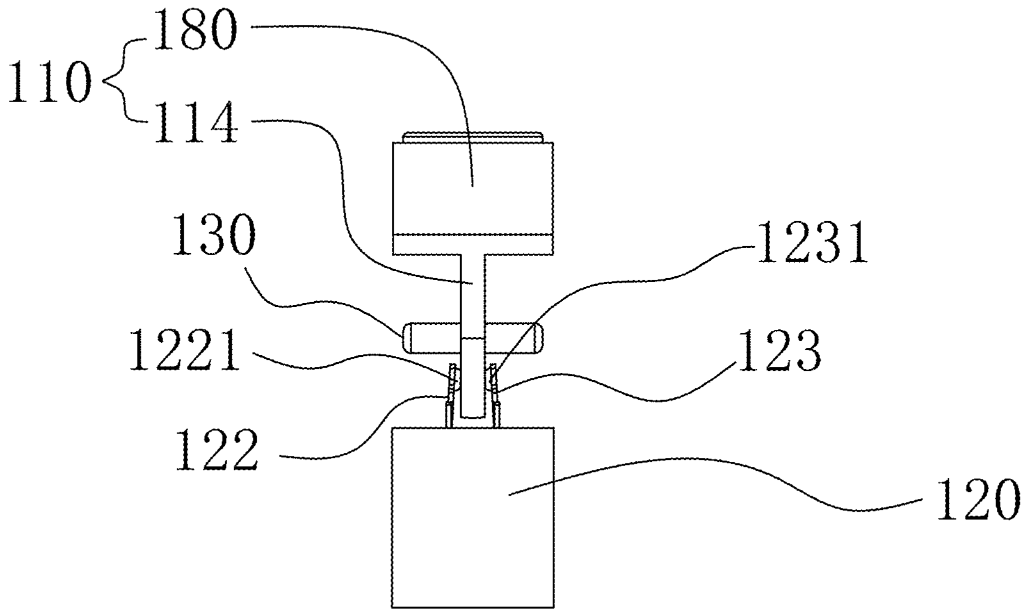
FIG. 2A is a schematic side structure diagram when a electric connecting part and a second connecting part of the Data cable provided by the first embodiment of the present disclosure are connected.
Figure 2B:
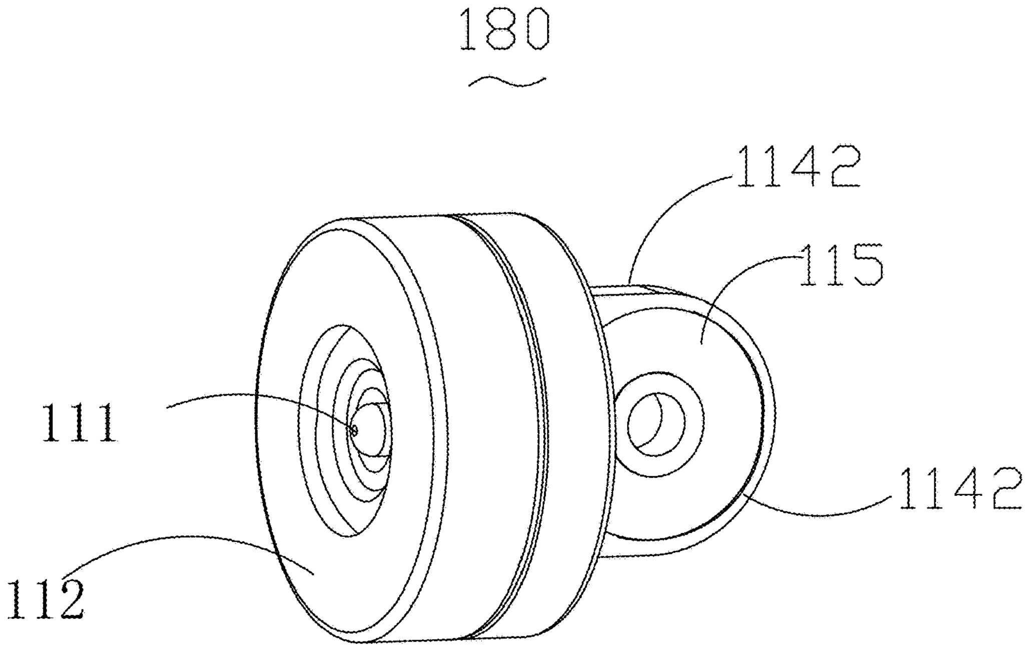
FIG. 2B is a schematic perspective diagram of the electric connecting part in the first embodiment of the present disclosure.

Referring to FIG. 2, FIG. 2A and FIG. 2B, the electric connecting part 110 includes a terminal head 180 and an adapter plate 114 connected to the terminal head 180. Conducting sheets 115 are arranged on the adapter plate 114. The adapter plate 114 includes an arc-shaped structure. The conducting sheets 115 are electrically connected to the terminal head 180 and the second connecting part 120.

Each conducting sheet 115 includes an arc-shaped structure. The adapter plate 114 includes two main surfaces 1142 arranged opposite to each other. The conducting sheets 115 are arranged on one main surface 1142 or on the two main surfaces 1142 of the adapter plate 114. There are at least two conducting sheets 115, which are arranged to play a charging role. When the number of the conducting sheets 115 on one main surface 1142 is greater than or equal to 2, the conducting sheets 115 are arranged in a form of a concentric ring.

The arc-shaped structure of each conducting sheet 115 may be an arc-shaped segment, a semicircular ring structure or a closed circular ring structure. One end of the adapter plate 114 away from a conducting needle 111 is arranged in an arc-shaped structure, which may be an arc-shaped segment, a semicircular ring structure, or a circular ring structure with an arc angle greater than 180°.

Figure 2C:
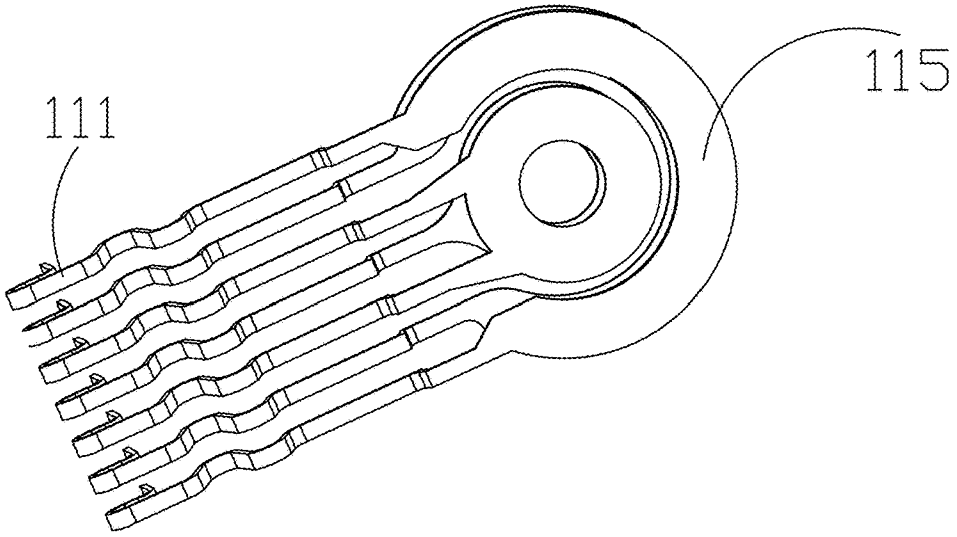
FIG. 2C is a schematic perspective diagram when a conducting sheet and a conducting needle are integrated in the first embodiment of the present disclosure.

Referring to FIG. 2C, the terminal head 180 includes conducting needles 111 which are electrically connected to the corresponding conducting sheets 115. Each conducting needle 111 and the corresponding conducting sheet 115 are integrally formed. In some other embodiments, the conducting needle 111 and the corresponding conducting sheet 115 may not be arranged integrally, and may be connected by welding or introducing other components. Optionally, the conducting needle 111 may be of a bent structure and thus have the elasticity. Meanwhile, the conducting needle 111 may also be a conducting needle of a pogopin type.

Referring to FIG. 2, FIG. 2A, FIG. 2B and FIG. 2C, the number of conducting needles 111 is set to at least 1. When the number of the conducting needles 111 is greater than or equal to 2, the conducting needles 111 are arranged in a straight line.

In some embodiments, when the electric connecting part 110 is a magnetically attractable plug, the electric connecting part 110 is used for magnetically attractable connection with an electronic apparatus. The electronic apparatus is configured to plug into a socket of a portable electronic device. The electronic apparatus includes any one of a type-c terminal, a micro-usb terminal or a lightning terminal that may be connected to the electric connecting part 110 in a magnetically attractable manner. The terminal head 180 further includes a conducting connection plate 1111, a magnetic member 112 and a connector housing 1101. The magnetic member 112 is made of a magnetic material. The conducting connection plate 1111 is circular. Each conducting needle 111 is electrically connected to the conducting connection sheet 1111. The magnetic member 112 is annular and sleeves the conducting needle 111. One end of the magnetic member 112 is in contact with and electrically connected to the conducting connection plate 1111. The conducting needle 111 and the magnetic member 112 are insulated from each other. The conducting needle 111 and the magnetic member 112 may be insulated by an insulation layer. In addition, the insulation layer may be made of a transparent plastic material, thereby facilitating the light transmission of the indicator light 113. The connector housing 1101 sleeves the magnetic member 112, such that a connector is simple and stable, and easy to disassemble and assemble. The adapter plate 114 is located at one end of the magnetic member 112 away from the conducting needle 111, and one end of the adapter plate 114 away from the conducting needle 111 and the magnetic member 112 is of a semicircular structure, or of a circular structure, such that the Data cable 100 can be rotated at a larger angle without obstacles. One end of the adapter plate 114 close to the magnetic member 112 is of a straight plate structure. The rotating shaft 130 passes through the circle center of the semicircular structure of the adapter plate 114, so that the electric connecting part 110 is rotatably connected to the second connecting part 120. Two sides of the adapter plate 114 are respectively a positive electrode and a negative electrode, which are configured to be electrically connected to the second connecting part 120.

In some embodiments, the adapter plate 114 is a PCB (Printed Circuit Board).

Figure 2D:
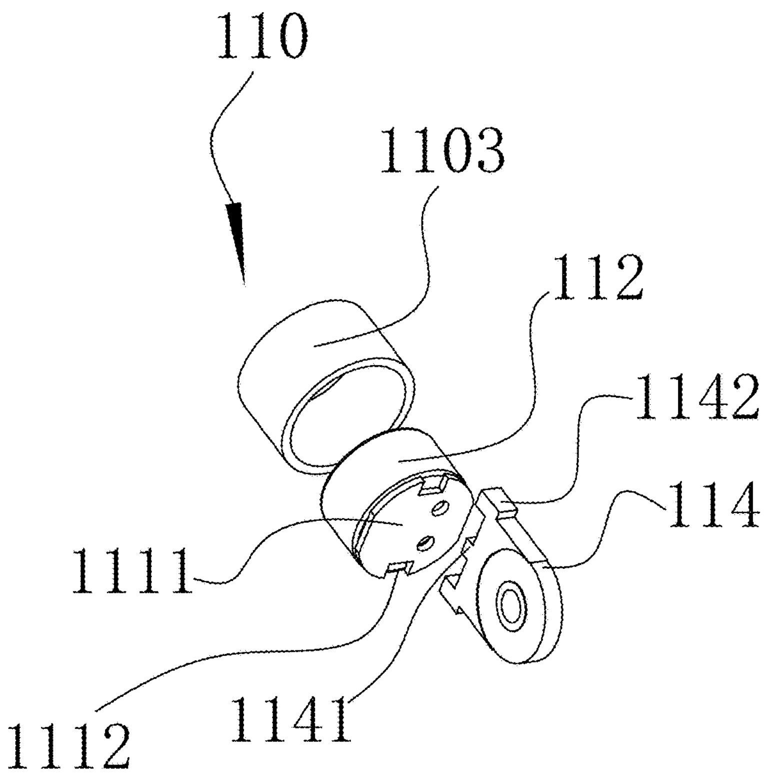
FIG. 2D is another partial exploded view of the electric connecting part in the first embodiment of the present disclosure.

Referring to FIG. 2D, at least two conducting connection pins 1141 are arranged at one end of the adapter plate 114 away from the rotating shaft 130. One of the conducting connection pins 1141 is electrically connected to one conducting sheet 115 on one main surface 1142 and the magnetic member 112, and the other conducting connection pins 1141 are electrically connected to the other conducting sheets 115 and the conducting connection plate 1111. The conducting needle 111 is electrically connected to the corresponding conducting sheet 115 on the adapter board 114 through the conducting connection plate 1111. Of course, if the magnetic member 112 fails to play a role of electrical transmission, the conducting connection pins 1141 do not need to be electrically connected to the magnetic member 112, and all the conducting connection pins 1141 are electrically connected to the conducting connection plate 1111. The conducting connection plate 1111 is provided with notches 1112 corresponding to the conducting connection pins 1141. The conducting connection pins 1141 are connected to the conducting connection plate 1111. Each conducting connection pin 1141 passes through the two notches 1112 and is connected to the corresponding conducting needle 111, such that the conducting pin 111 and the magnetic member 112 are both electrically connected to the conducting connection pin 1141, thereby electrically conducting both the conducting needle 111 and the magnetic member 112 with the adapter plate 114. Therefore, the Data cable is simple and compact in structure.

In this embodiment, the adapter plate 114 is a rigid substrate, which facilitates stable rotational connection with the second connecting part 120.

When in use, whether the electric connecting part 110 and the second connecting part 120 are electrified is determined first through the indicator light 113 of the electric connecting part 110. When the electric connecting part 110 and the second connecting part 120 are electrified, the indicator light 113 will be turned on. An external connector may be then connected to the conducting needle 111 and the magnetic member 112. Since the magnetic member 112 is magnetic and capable of attracting the external connector, the Data cable 100 in this case can transmit electric power to the external device through the external connector such as a USB connector.

Figure 3A:
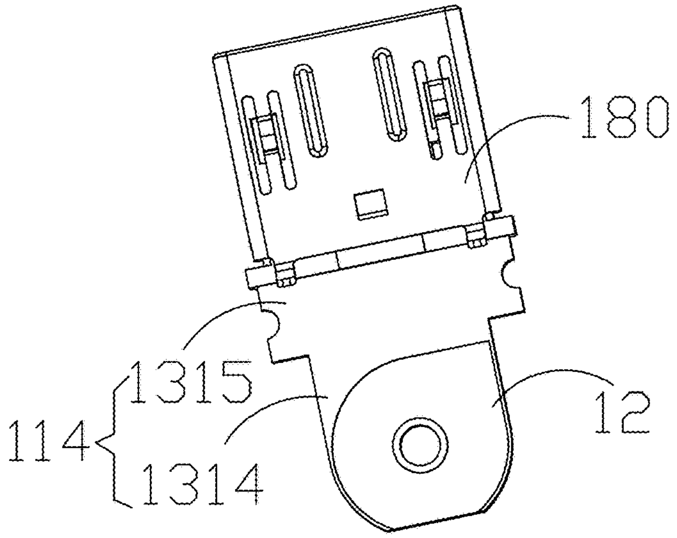
FIG. 3A is a schematic perspective diagram when the electric connecting part is a micro-usb connector in a first variant embodiment of the present disclosure.
Figure 3B:
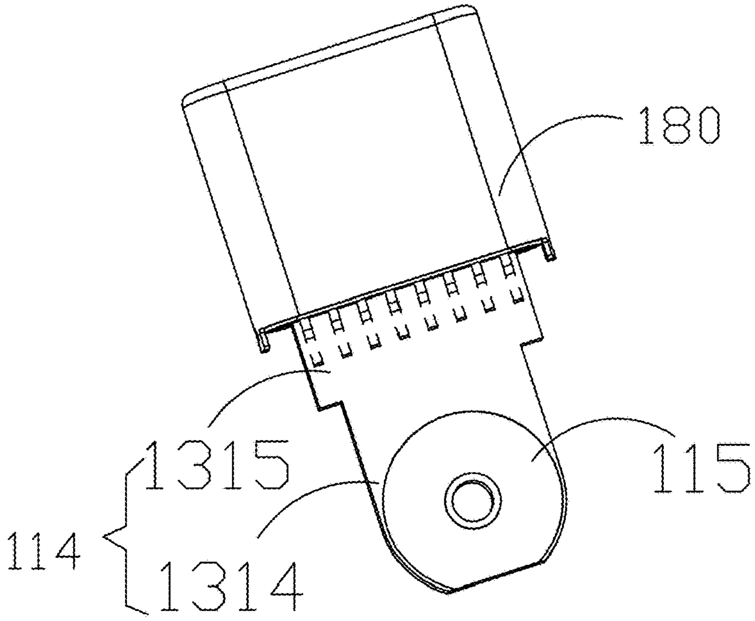
FIG. 3B is a schematic perspective diagram when the electric connecting part is a type-c connector in the first variant embodiment of the present disclosure.
Figure 3C:
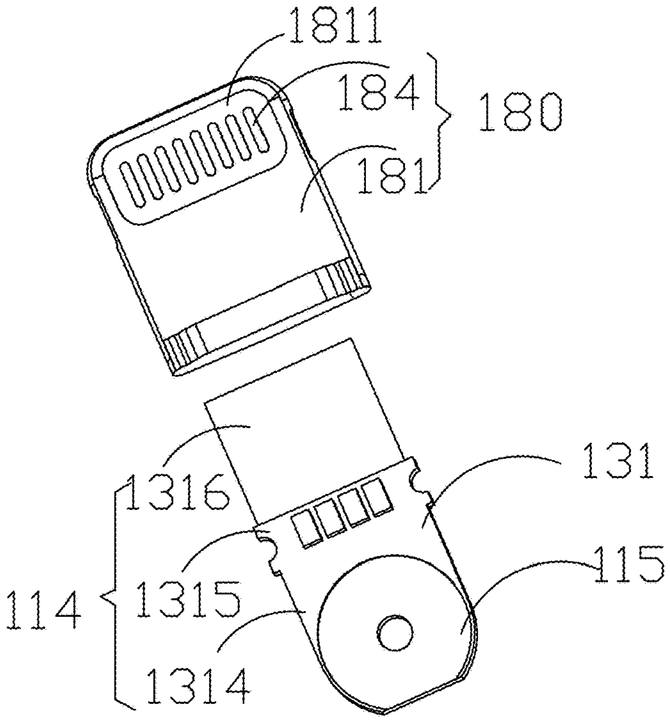
FIG. 3C is a schematic perspective diagram when the electric connecting part is a lightning connector in the first variant embodiment of the present disclosure.

Referring to FIG. 3A, FIG. 3B and FIG. 3C, in a first variant embodiment, the terminal head 180 is configured to plug into a socket of an electronic device. The adapter plate 114 includes an adapter section 1314 and a connecting section 1315, wherein a width of the adapter section 1314 is less than a width of the connecting section 1315. The adapter plate 114 is of a "T"-shaped structure. When the terminal head 180 is a lightning plug, the terminal head 180 includes a first housing 181 and a metal needle 184. The first housing 181 is provided with a cavity for accommodating the metal needle 184 and a window 1811 for allowing the metal needle 184 to be exposed. The adapter plate 114 further includes a plug-in section 1316 connected to one side of the connecting section 1315 away from the adapter section 1314, wherein the plug-in section 1316 extends into the cavity and is electrically connected to the metal needle 184.

When the terminal head 180 is a micro-usb plug, the terminal head 180 includes a second housing 182 for accommodating the metal needle 184, wherein one end of the metal needle 184 extends out of the second housing 182 and is electrically connected to the connecting section 1315, and the other end of the metal needle 184 is electrically connected to an electronic device.

When the terminal head 180 is a type-c plug, the terminal head 180 includes a third housing 183 for accommodating the metal needle, wherein one end of the metal needle extends out of the third housing 183 and is electrically connected to the connecting section 1315, and the other end of the metal needle 184 is electrically connected to an electronic device.

Figure 4:
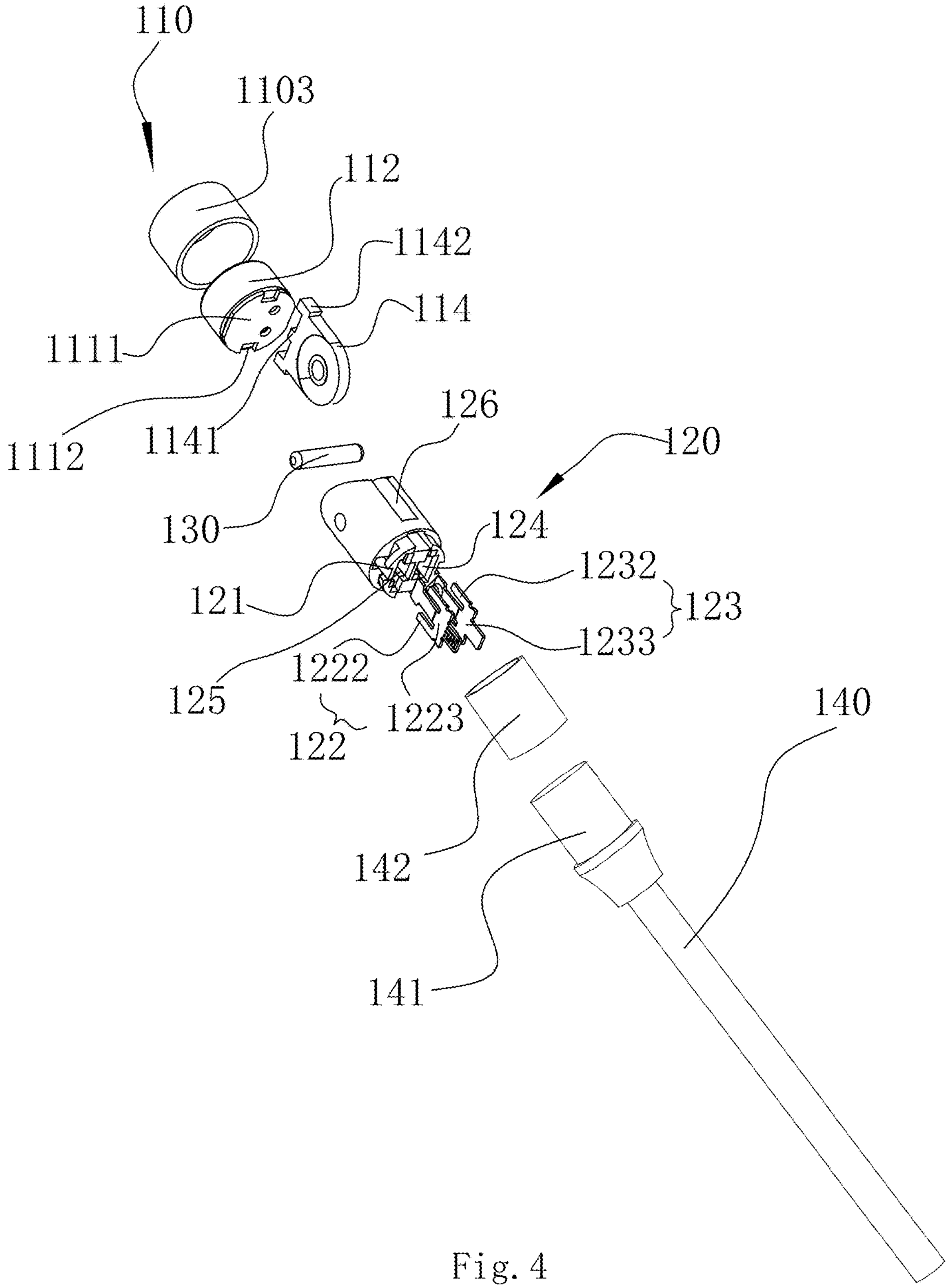
FIG. 4 is an exploded schematic diagram of the Data cable provided by the first embodiment of the present disclosure.

Referring to FIG. 2A and FIG. 4, the second connecting part 120 includes a fixed seat 141, a fixed core 121 connected to the fixed seat 141, a fixed seat sleeve 142 that sleeves the fixed seat 141 and the fixed core 121, and a first conducting connection sheet 122 and a second conducting connection sheet 123 that are inserted to the fixed core 121. The fixed core 121 is columnar, and provided with a through groove 126 in the middle of the end surface. The adapter plate 114 is arranged in the through groove 126. The rotating shaft 130 passes through the fixed core 121 and the adapter plate 114, such that the fixed core 121 is rotatably connected to the adapter plate 114. Since the fixed core 121 is provided with the through groove 126 and the adapter plate 114 is arranged in the through groove 126, the overall size of the Data cable 100 may be reduced.

In some embodiments, the fixed core 121 is an injection molding part, which is obtained by injection molding directly on other components of the second connecting part 120.

In some embodiments, the fixed core 121 is transparent. The transparent design can facilitate the indicator light 113 to transmit light.

The first conducting connection sheet 122 includes a first fixing sheet 1223, a first electric brush 1221 arranged on the first fixing sheet 1223, and two first fixing buckles 1222 arranged on both sides of the first fixing sheet 1223 respectively, such that the first conducting connection sheet 122 is in a trident shape, and is thus easier to fix. The second conducting connection sheet includes a second fixing sheet 1233, a second electric brush 1231 arranged on the second fixing sheet 1233, and two second fixing buckles 1232 arranged on both sides of the second fixing sheet 1233 respectively, such that the second conducting connection sheet 123 is in a trident shape, and is thus easier to fix. The fixed core 121 is provided with a first slot hole 124 and a second slot hole 125 which are matched with the first conducting connection sheet 122 and the second conducting connection sheet 123 in shape. The first conducting connection sheet 122 and the second conducting connection sheet 123 are respectively arranged in the first slot 124 and the second slot 125 in an interference fit manner, such that the structure is compact and stable. One end of the electric connecting part 110 is electrically connected to the line body 40. The first electric brush 1221 and the second electric brush 1231 are in slidable contact with two surfaces of the adapter plate 114 respectively. Therefore, when the adapter plate 114 rotates relative to the second connecting part 120, the first electric brush 1221 and the second electric brush 1231 can always be in contact with two surfaces of the adapter plate 114 respectively. By means of such design, the electric connecting part 110 and the second connecting part 120 are maintained to be electrically connected when they rotate relative to each other around the rotating shaft 130, such that the Data cable 100 is electrified stably while rotating. One end of the first conducting connection sheet 122 and one end of the second conducting connection sheet 123 away from the electric connecting part 110 are connected to the fixed seat 141. The fixed seat 141 is connected to the line body 140.

In some embodiments, the length of each of the first fixing buckles 1222 is less than that of the first fixing sheet 1223, and the length of each of the second fixing buckles 1232 is less than that of the second fixing sheet 1233. By means of such length design, the first fixing sheet 1223 and the second fixing sheet 1233 are long enough to be in contact with the adapter plate 114, thereby ensuring that the first electric brush 1221 and the second electric brush 1231 are in stable contact with the adapter plate 114. The first fixing buckles 1222 and the second fixing buckles 1232 may be located in the first slot hole 124 and the second slot hole 125 to further fix the first conducting connection sheet 122 and the second conducting connection sheet 123 to the second connecting part 120 to prevent relative displacement there between.

In some embodiments, the width of the first slot hole 124 is less than that of the first conducting connection sheet 122, and the width of the second slot hole 125 is less than that of the second conducting connection sheet 123. When the first conducting connection sheet 122 and the second conducting connection sheet 123 are respectively located in the first slot hole 124 and the second slot hole 125, the first conducting connection sheet 122 and the second conducting connection sheet 123 expand outward due to elasticity to compress inner walls of the first slot hole 124 and the second slot hole 125, respectively, such that the first conducting connection sheet 122 and the second conducting connection sheet 123 are connected to the second connecting part 120 more stably.

In some embodiments, the width of the first slot hole 124 is less than that of the first conducting connection sheet 122, and the width of the second slot hole 125 is less than that of the second conducting connection sheet 123, thereby achieving interference fit. In addition, the first conducting connection sheet 122 and the second conducting connection sheet 123 are in a trident shape respectively, which makes them elastic, stable in structure and unlikely to break.

In some embodiments, the first slot hole 124 and the second slot hole 125 pass through the through groove 126 from one ends away from the through groove 126, such that parts of the first slot hole 124 and the second slot hole 125 are respectively located on two walls of the through groove 126, and the first slot hole 124 and the second slot hole 125 are communicated with the through groove 126. The first electric brush 1221 and the second electric brush 1231 are respectively located on the parts, located in the through groove 126, of the first slot hole 124 and the second slot hole 125, and the other parts of the first electric brush 1221 and the second electric brush 1231 are exposed out of the first slot hole 124 and the second slot hole 125. Since the first electric brush 1221 and the second electric brush 1231 are fixed to one end of the first fixing sheet 1223 and one end of the second fixing sheet 1233, respectively, this structure can prevent the first conducting connection sheet 122 and the second conducting connection sheet 123 from deforming and prevent the first electric brush 1221 or the second electric brush 1231 from being out of a contact state with the adapter plate 114.

Figure 5:
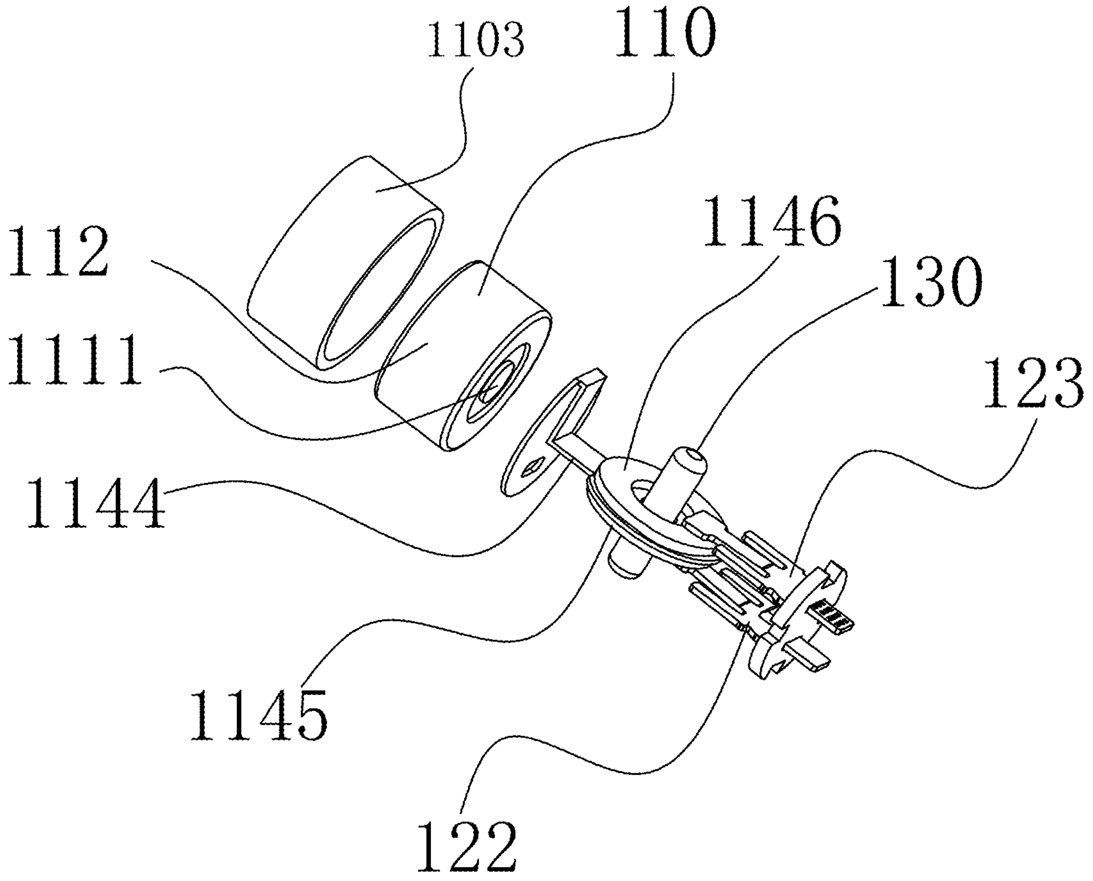
FIG. 5 is an exploded schematic diagram of a electric connecting part in a second variant embodiment of the present disclosure.

Referring to FIG. 5, in a second variant embodiment of the Data cable 100 provided by the present disclosure, the adapter plate 114 is different from the adapter plate in the foregoing embodiments. The adapter plate 114 includes an adapter plate body. The adapter plate body is a flexible circuit board 1144. The adapter plate 114 includes a flexible circuit board 1144, and a first conductive sheet 1145 and a second conductive sheet 1146 arranged on both sides of the flexible circuit board 1144 respectively and electrically connected to the flexible circuit board 1144. One end of the flexible circuit board 1144 is electrically connected to the conducting needle 111 and the magnetic member 112. The first electric brush 1221 and the second electric brush 1231 are in elastic contact with the first conductive sheet 1145 and the second conductive sheet 1146, respectively. A material for the first conductive sheet 1145 and the second conductive sheet 1146 includes but is not limited to steel and copper. By using the flexible circuit board 1144 to conduct electricity, the adapter plate 114 can be manufactured more conveniently and fast, and the yield rate can be increased. In addition, through the arrangement of the first conductive sheet 1145 and the second conductive sheet 1146 with higher hardness, the wear resistance of the adapter plate 114 can be improved, thereby enabling the Data cable 100 to be more durable. It can be understood that, in order to ensure the strength of the flexible circuit board 1144, a covering structure may be arranged between a portion close to the end of the flexible circuit board 114 connected to the conducting needle 111 and one end of each of the first conductive sheet 1145 and the second conductive sheet 1146 to increase the strength of the flexible circuit board 1144.

Figure 6:
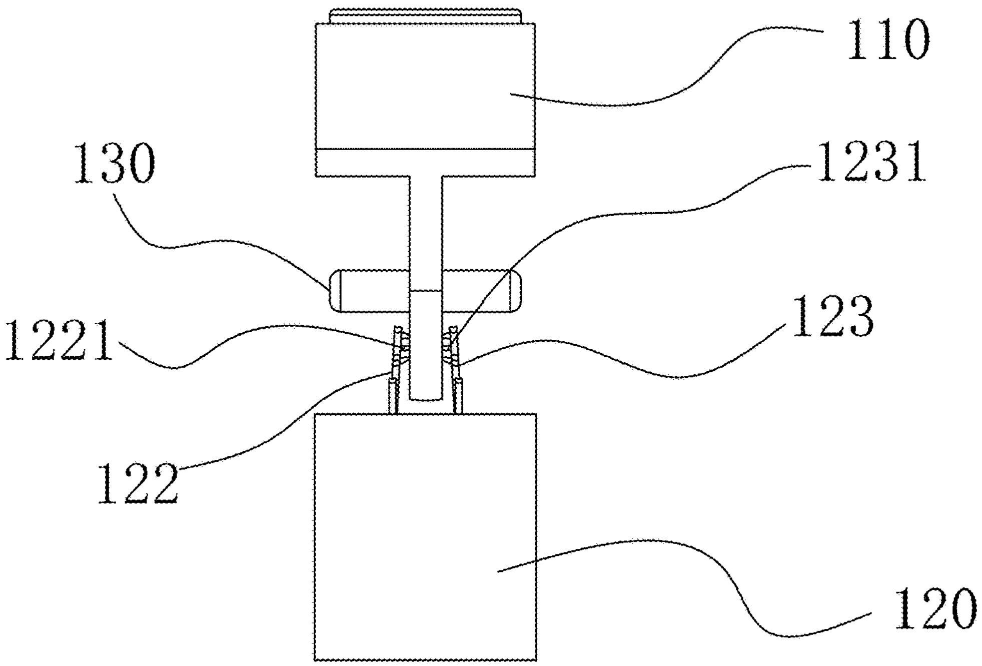
FIG. 6 is a schematic side structure diagram when the electric connecting part and a second connecting part in the second variant embodiment of the present disclosure are connected.

Referring to FIG. 6, in the second variant embodiment of the Data cable provided by the present disclosure, the number of the first electric brushes 1221 and the second electric brushes 1231 may be at least 2, respectively.

Figure 7:
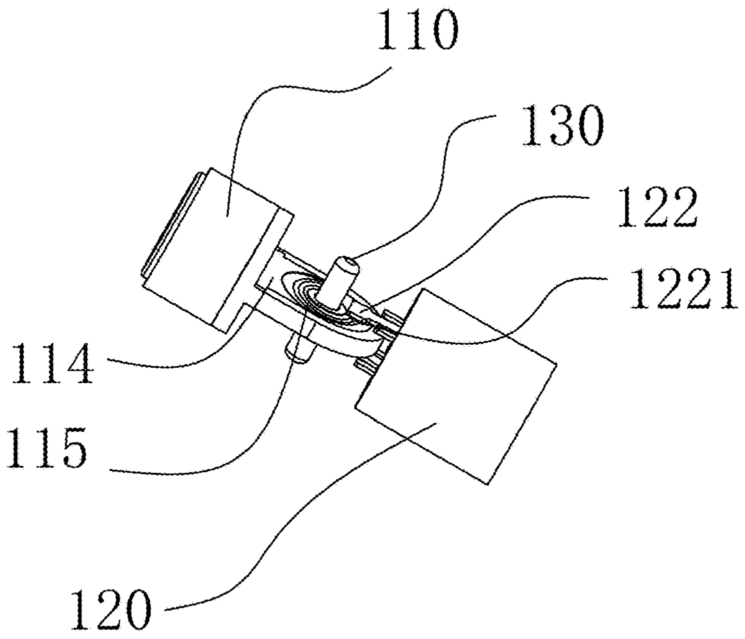
FIG. 7 is another schematic side structure diagram when the electric connecting part and the second connecting part in the second variant embodiment of the present disclosure are connected.
Figure 8:
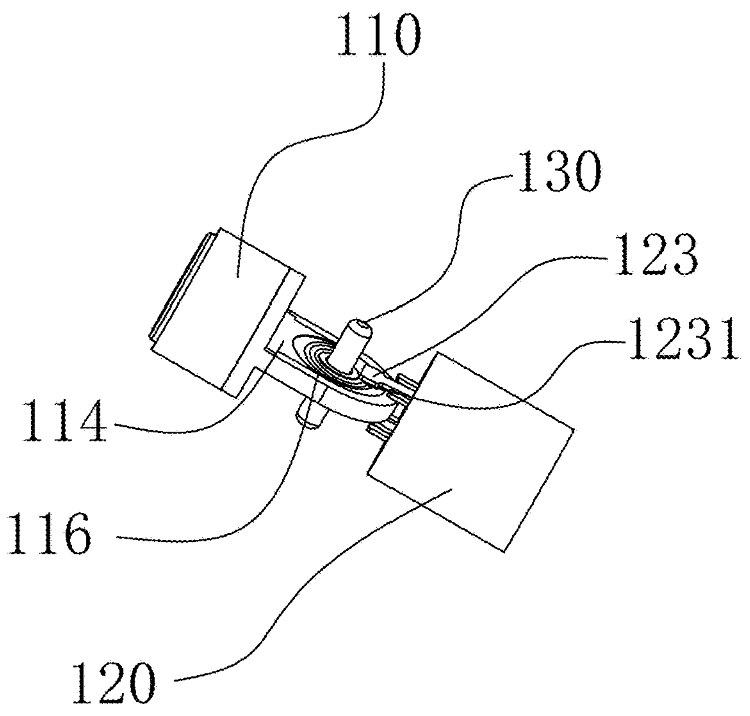
FIG. 8 is yet another schematic side structure diagram when the electric connecting part and the second connecting part in the second variant embodiment of the present disclosure are connected.

As shown in FIG. 7 and FIG. 8, in the case of two first electric brushes 1221 and two second electric brushes 1231, the two first electric brushes 1221 are distributed side by side, so that annular trajectories with different diameters are formed respectively when the two first electric brushes 1221 move on the side surface of the adapter plate 114. The two second electric brushes 1231 are distributed side by side, so that annular trajectories with different diameters are formed respectively when the two second electric brushes 1231 move on the side surface of the adapter plate 114. During the movement, the first electric brushes 1221 and the second electric brushes 1231 are always closely attached to both sides of the adapter plate 114, thereby achieving the conduction between the first electric brushes 1221 and the second electric brushes 1231 with the adapter plate 114.

Figure 9:
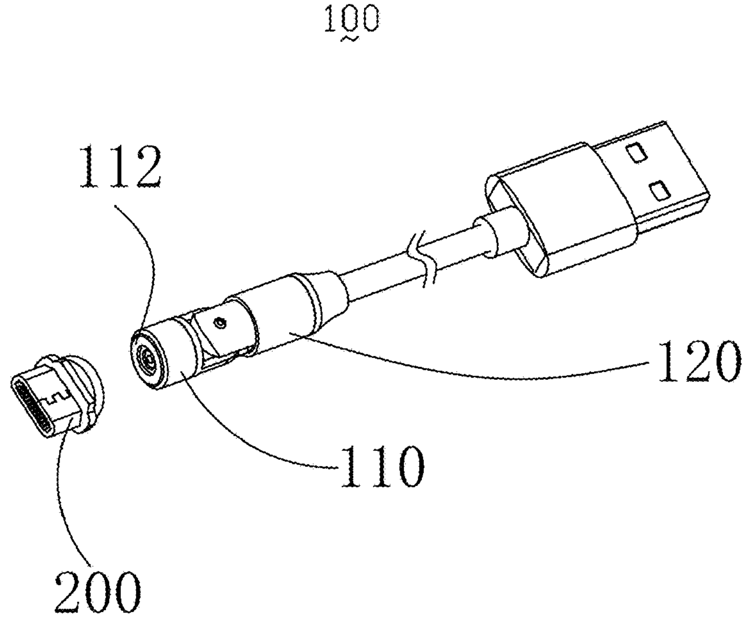
FIG. 9 is a schematic perspective diagram of a Data cable including a magnetically attractable male connector in the present disclosure.
Figure 10:
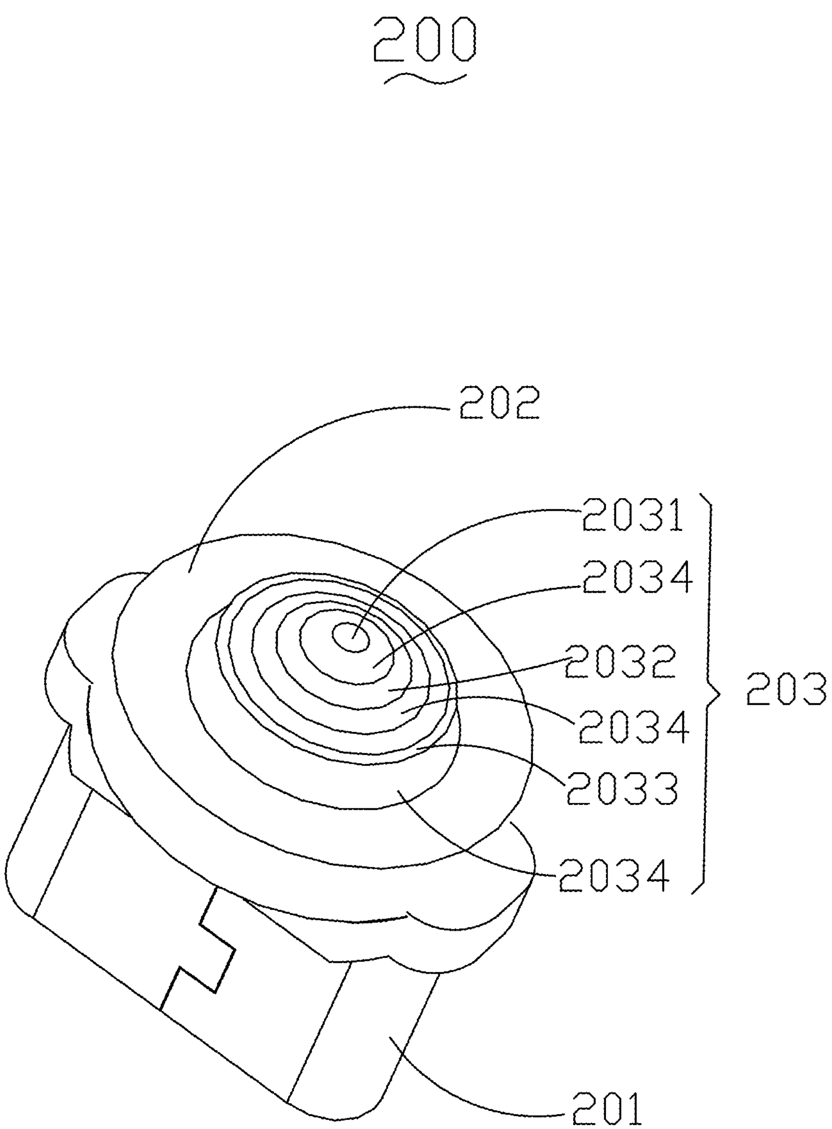
FIG. 10 is a schematic perspective diagram of the magnetically attractable male connector in the present disclosure.

Referring to FIG. 9 and FIG. 10, in some variant embodiments, the Data cable 100 further includes a magnetically attractable male connector 200. The magnetically attractable male connector 200 is detachably connected magnetically and electrically to the electric connecting part 110, and can be easily connected to an external device. The magnetically attractable male connector 200 includes a plug connector 201 configured to plug into a USB socket of a mobile phone, a first magnetic element 202 connected to the plug connector 201 and a conductive part 203 arranged inside the first magnetic element 202. The conductive part 203 and the plug connector 201 are electrically conducted. The plug connector 201 may be any one of a type-c connector, a micro-usb plug or a lightning connector. The conductive part 203 includes an electrode contact 2031, as well as a first contact piece 2032 and a second contact piece 2033 which are arranged concentrically around the electrode contact 2031 in sequence. An insulating spacer layer 2034 is respectively arranged between the electrode contact 2031 and the first contact piece 2032, as well as between the first contact piece 2032 and the second contact piece 2033 to space the electrode contact 2031 and the first contact piece 2032, as well as the first contact piece 2032 and the second contact piece 2033, thereby avoiding a short circuit caused by mutual contact of the these three components. The insulating layer 2034 is also arranged outside the second contact piece 2033, to space the second contact piece 2033 and the first magnetic element 202. The first magnetic element 202 is of a circular ring structure that is arranged on the plug connector 201 and is also concentrically arranged with the electrode contact 2031 as a circle center. The first magnetic element 202 may be a magnet or other magnetic material, and serves as a "V−" pole.

When the electric connecting part 110 is connected to the magnetically attractable male connector 200, the first magnetic element 202 is magnetically connected to the magnetic member 112, and the three conducting needles 111 are in contact with the electrode contact 2031, the first contact piece 2032 and the second contact piece 2033, respectively.

By arranging a plurality of the conducting needles 111 to be electrically connected to the first contact piece 2032, the first contact piece 2032 and the second contact piece 2033 of the magnetically attractable male connector 200, the Data cable 100 may provide a plurality of electrified circuits for the external device, thereby achieving a function of adjusting an angle rotatably while realizing functions of conduction and data transmission.

Figure 11:
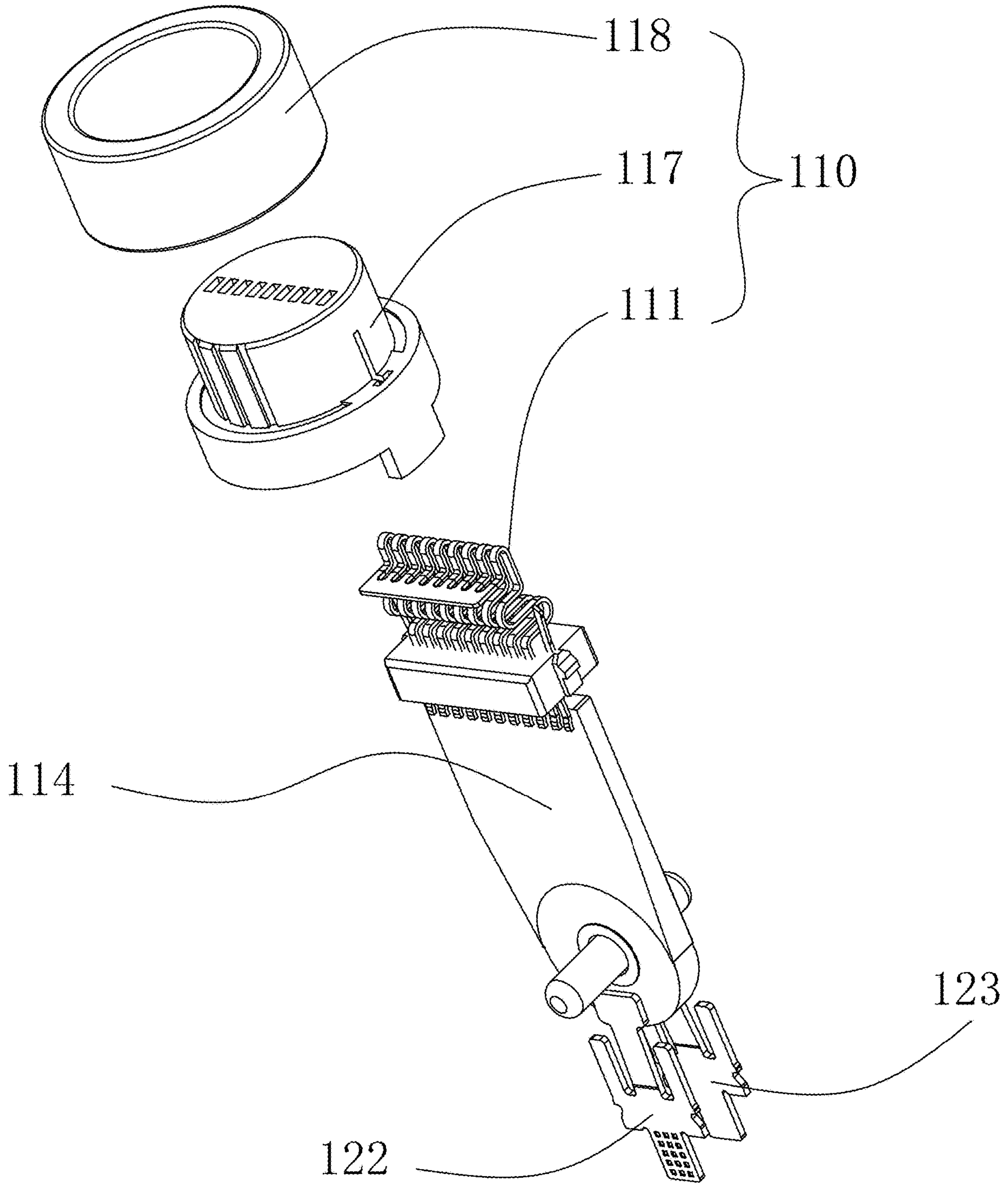
FIG. 11 is an exploded schematic diagram of a electric connecting part in a third variant embodiment of the present disclosure.

Referring to FIG. 11, in a third variant embodiment of the Data cable 100 provided by the present disclosure, the electric connecting part 110 includes conducting needles 111, insulating sleeves 117 sleeving the conducting needles 111, and magnetically attractable sleeves 118 sleeving the insulating sleeves 117. The number of the conducting needles 111 may be five or more. The five or more conducting needles 111 may be defined as a D+ pin, a D− pin, a Vcc+ pin, a GND pin, or a CC pin, respectively. One of the conducting needles 111 is a ground terminal. The tail ends of the five or more conducting needles 111 are connected to each other to achieve common grounding. Each conducting needle 111 has bends in the middle, wherein one of the bends passes through the corresponding insulating sleeve 117, so that the conducting needle 111 can be connected to the external device. Each conducting needle 111 is fixed at one end of the adapter plate 114 away from the first conducting connection sheet 122 and the second conducting connection sheet 123, and is electrically connected to the adapter plate 114. The design of the five or more conducting needles 111 can realize power transmission and data transmission at the same time. In addition, the magnetically attractable sleeves 118 can establish a magnetic connection with the external device conveniently, and are simple in structure and easy to disassemble and assemble.

Of course, in some other embodiments, the five or more conducting needles 111 may also be defined as other types according to the electrical characteristics required by a user.

Figure 12:
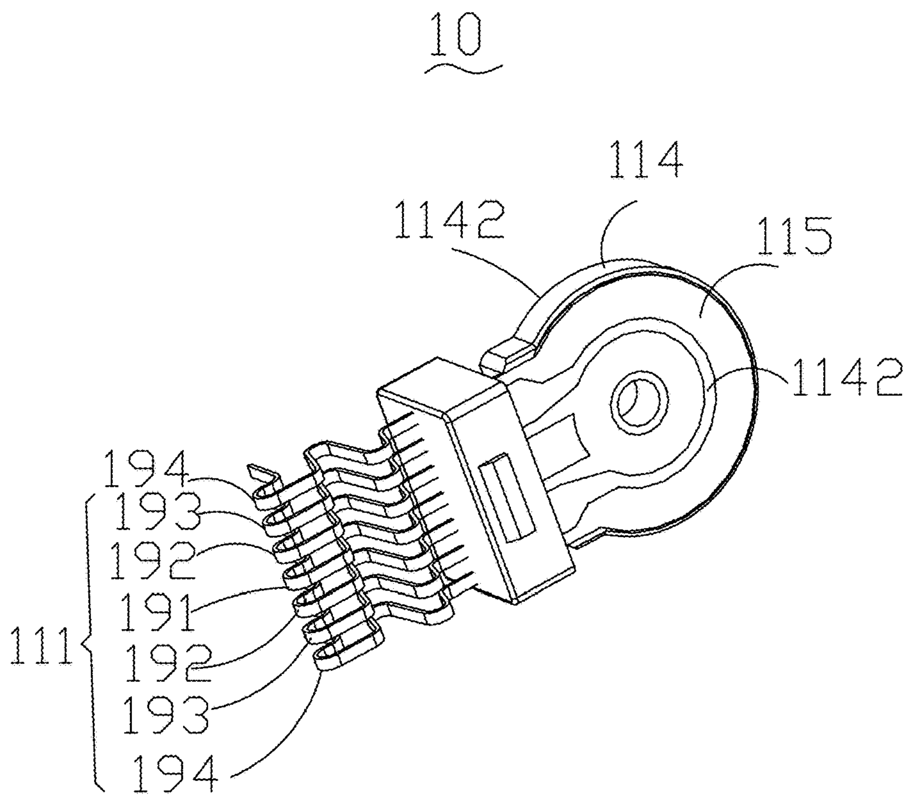
FIG. 12 is a partial schematic structural diagram of a electric connecting part provided by a fourth variant embodiment of the present disclosure.

Referring to FIG. 12, in a fourth variant embodiment, for the convenience of description, the two main surfaces 1142 of the adapter plate 114 are defined as a front surface and a back surface, respectively. The number of the conducting needles 111 is set to seven. The seven conducting needles 11 are arranged at equal intervals. The conducting needles 111 include a first conducting needle 191 located in the center, as well as two second conducting needles 192, two third conducting needles 193 and two fourth conducting needles 194, which are symmetrically arranged on both sides of the first conducting needle 191 in sequence, respectively. The distance between each of the second conducting needles 192 and the first conducting needle 191 is less than the distance between each of the fourth conducting needles 194 and the first conducting needle 191. There are two conducting sheets 115 on each main surface 1142. That is, there are two conducting sheets 115 on the each of the front and back surfaces. The first conducting needle 191 and the second conducting needles 192 are electrically connected to one conducting sheet 115 on each of the two main surfaces 1142 close to the circle center. That is, the first conducting needle 191 and the second conducting needles 192 are electrically connected to one conducting sheet 115 on each of the front and back surface close to the circle center. The third conducting needles 193 and the fourth conducting needles 194 are electrically connected to one conducting sheet on each of the front and back surface 115 away from the circle center. That is, the third conducting needles 193 and the fourth conducting needles 192 are electrically connected to one conducting sheet 115 on each of the front and back surfaces away from the circle center. Signals of the first conducting needle 191, the second conducting needles 192, the third conducting needles 193, and the fourth conducting needles 194 are defined as: "V+", "V−", "D+" and "D−" to achieve charging and data transmission functions.

As a variant, the seven conducting needles 111 may not be arranged at equal intervals, as long as they can be electrically connected to the corresponding conducting sheets 115 and the electronic device.

Figure 13:
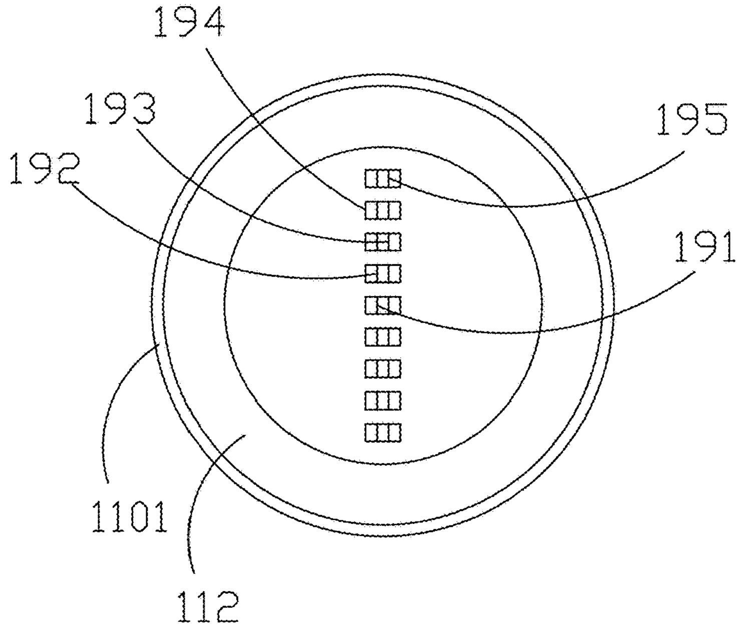
FIG. 13 is a front view of a electric connecting part provided by the fourth variant embodiment of the present disclosure.
Figure 14:
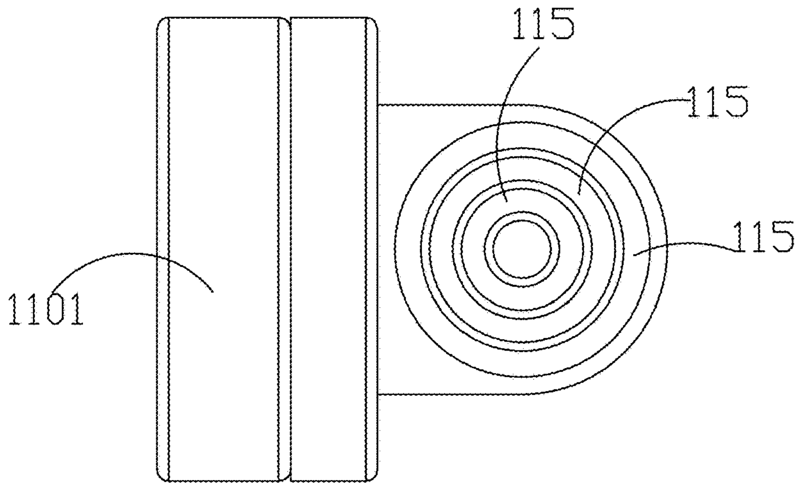
FIG. 14 is a side view of the electric connecting part provided by the fourth variant embodiment of the present disclosure.

Referring to FIG. 13 and FIG. 14, the number of the conducting needles 111 is set as nine. The nine conducting needles 111 are arranged at equal intervals, but are different from the foregoing embodiments in further including two fifth conducting needles 195. The distance between each of the second conducting needles 192 and the first conducting needle 191 is less than the distance between each of the fifth conducting needles 195 and the first conducting needle 191. There are three conducting sheets 115 on each main surface 1142. That is, there are three conducting sheets 115 on each of the front and back surfaces. The three conducting sheets 115 are insulated from each other. In addition, the conducting sheets 115 on each of the two main surfaces 1142 are insulated from each other. The first conducting needle 191 and the second conducting needles 192 are electrically connected to the conducting sheets 115 on two main surfaces 1142 close to the circle center. That is, the first conducting needle 191 and the second conducting needles 192 are electrically connected to one conducting sheet 115 on each of the front and back surfaces close to the circle center. The third conducting needles 193 and the fourth conducting needles 194 are electrically connected to two conducting sheets 115 in the middle. That is, the third conducting needles 193 and the fourth conducting needles 192 are electrically connected to one conducting sheet 115 on each of the front and back surfaces away from the circle center. Each of the fifth conducting needles 195 is electrically connected to the outermost conducting sheet 115 on each of the two main surfaces 1142. That is, each of the fifth conducting needles 195 is electrically connected to the outermost conducting sheet 115 on each of the front and back surfaces. The signals of the first conducting needle 191, the second conducting needles 192, the third conducting needles 193 and the fourth conducting needles 194 are defined as: "V+", "V−", "D+", and "D−". The signals of respective fifth conducting needles 195 are defined as "CC1" and "CC2". Of course, the signals may also be defined in other ways, depending on the needs of users.

Figure 15:
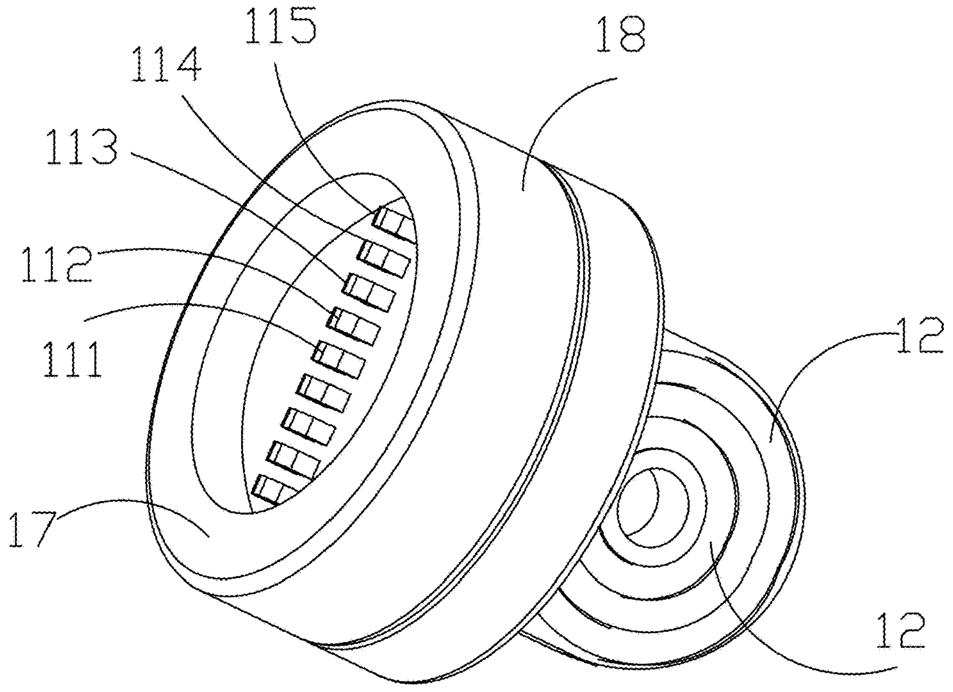
FIG. 15 is a schematic perspective diagram of a electric connecting part provided by a fifth variant embodiment of the present disclosure.

Referring to FIG. 15, in a fifth variant embodiment, the number of the conducting needles 111 is set to nine. The nine conducting needles 111 are arranged at equal intervals. The conducting needles 191 include a first conducting needle 191 located in the center, as well as two second conducting needles 192, two third conducting needles 193, two fourth conducting needles 194 and two fifth conducting needles, which are symmetrically arranged on both sides of the first conducting needle 191 in sequence, respectively. The distance between each of the second conducting needles 192 and the first conducting needle 1191 is less than the distance between each of the fifth conducting needles 195 and the first conducting needle 111. There are two conducting sheets 115 on each main surface 1142. That is, there are two conducting sheets 115 on each of the front and back surfaces. The two conducting sheets 115 are insulated from each other. The first conducting needle 191 and the second conducting needles 192 are electrically connected to the conducting sheets 115 on each of two main surfaces 1142 close to the circle center. That is, the first conducting needle 191 and the second conducting needles 192 are electrically connected to one conducting sheet 115 on each of the front and back surfaces close to the circle center. The third conducting needles 193 are electrically connected to the conducting sheets 115 on the outer sides of the fourth conducting needles 194. That is, the third conducting needles 193 and the fourth conducting needles 194 are electrically connected to one conducting sheet 115 on each of the front and back surfaces away from the circle center. Each of the fifth conducting needles 195 is connected to a fast charging resistor (not shown in the figures) to achieve a fast charging function. Signals of the first conducting needle 191, the second conducting needles 192, the third conducting needles 193, and the fourth conducting needles 194 are defined as: "V+", "V−", "D+", and "D−".

Figure 16:
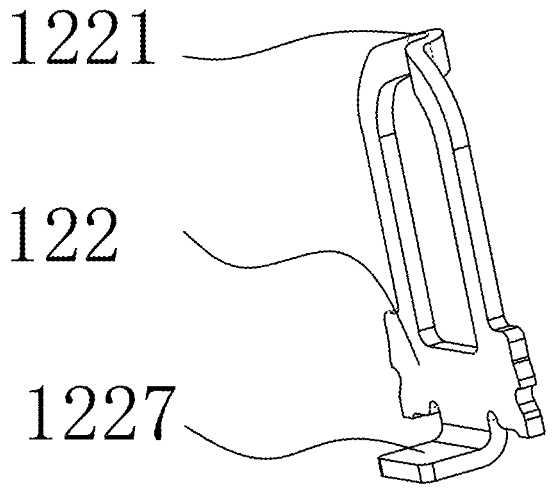
FIG. 16 is a schematic structural diagram of a first conducting connection sheet of a electric connecting part provided by a sixth variant embodiment of the present disclosure.

Referring to FIG. 16, in a sixth variant embodiment of the Data cable 100 provided by the present disclosure, the first conducting connection sheet 122 is sheet-like, and hollowed in the middle. One end of the first conducting connection sheet 122 is bent in a direction perpendicular to a sheet-like plane to form the first electric brush 1221. One end of the first conducting connection sheet 122 away from the first electric brush 1221 is bent at 90° to form a first contact plate 1227. Optionally, the first contact plate 1227 is of a planar structure.

Figure 17:
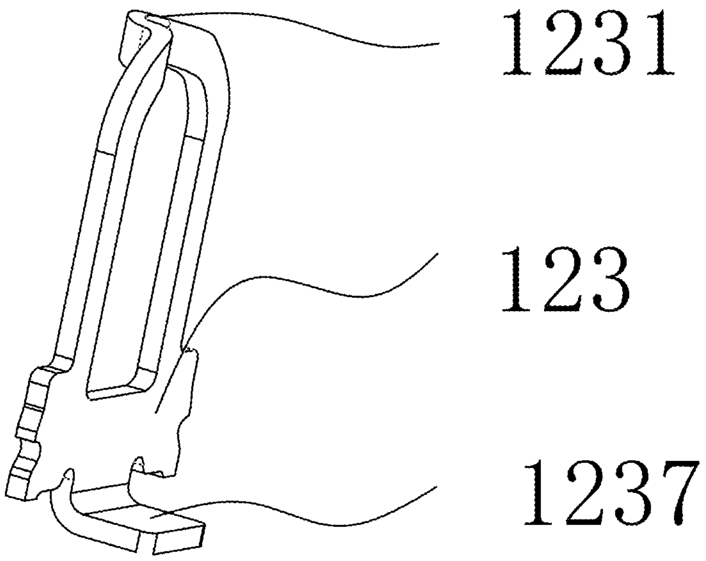
FIG. 17 is a schematic structural diagram of a second conducting connection sheet of the electric connecting part provided by the sixth variant embodiment of the present disclosure.

Referring to FIG. 17, the second conducting connection sheet 123 is sheet-like, and hollowed in the middle. The rotating shaft 130 passes through the middle hollowed area of the second conducting connection sheet 123. One end of the second conducting connection sheet 123 is bent in a direction perpendicular to a sheet-like plane to form the second electric brush 1231. One end of the second conducting connection sheet 123 away from the second electric brush 1231 is bent at 90° to form a second contact plate 1237. Optionally, the second contact plate 1237 is of a planar structure. This design simplifies the structure of the first electric brush 1221 and the second electric brush 1231, enabling the structure of the first conducting connection sheet 122 and the second conducting connection sheet 123 to be more stable and easier to process.

Figure 18:
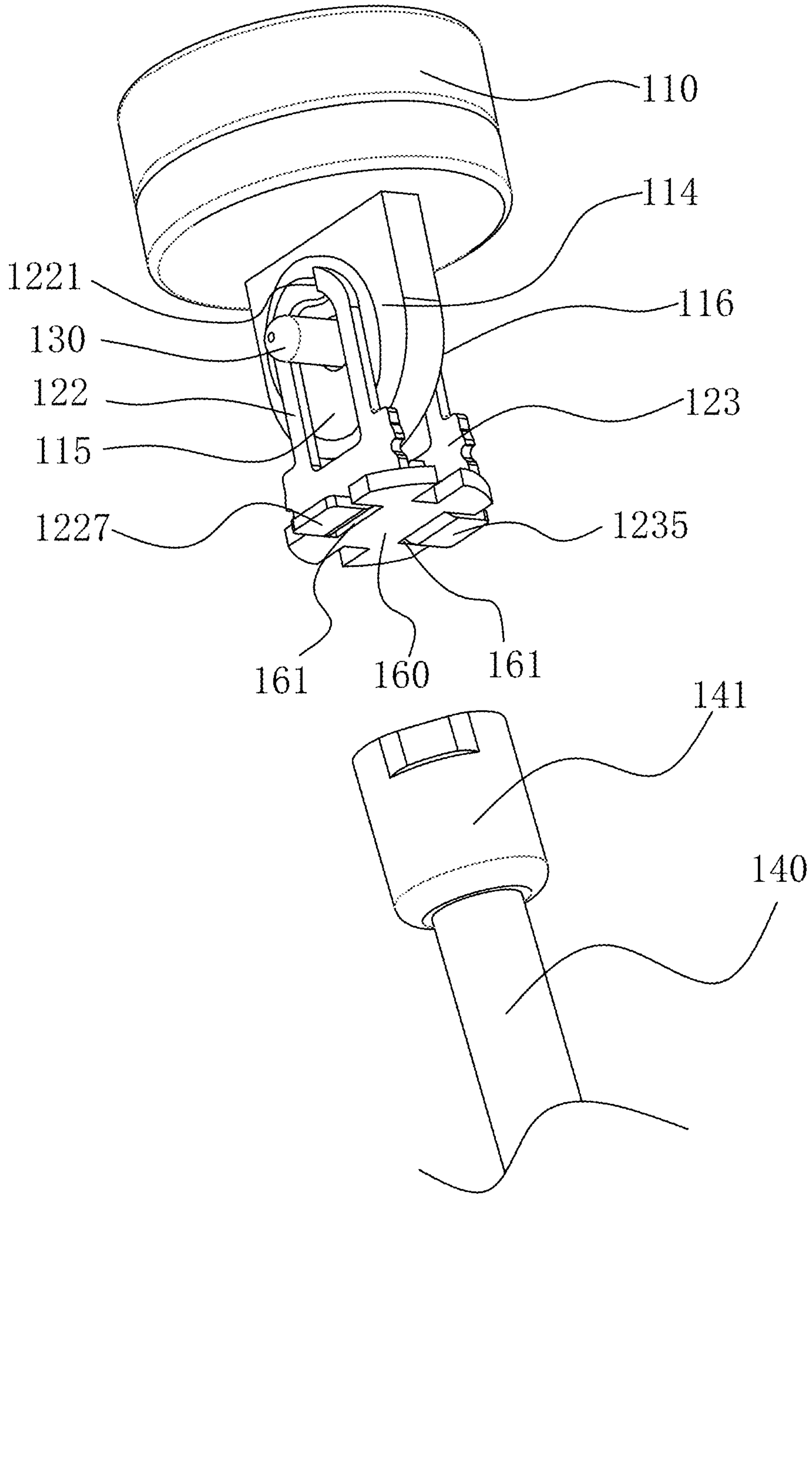
FIG. 18 is a partial schematic structural diagram when the electric connecting part provided by the sixth variant embodiment of the present disclosure includes a limiting plate.

Referring to FIG. 18, the rotating shaft 130 passes through the middle hollowed areas of the first conducting connection sheet 122 and the second conducting connection sheet 123. The first electric brush 1221 and the second electric brush 1231 are in contact with two side surfaces of the adapter plate 114, respectively.

Figure 19:
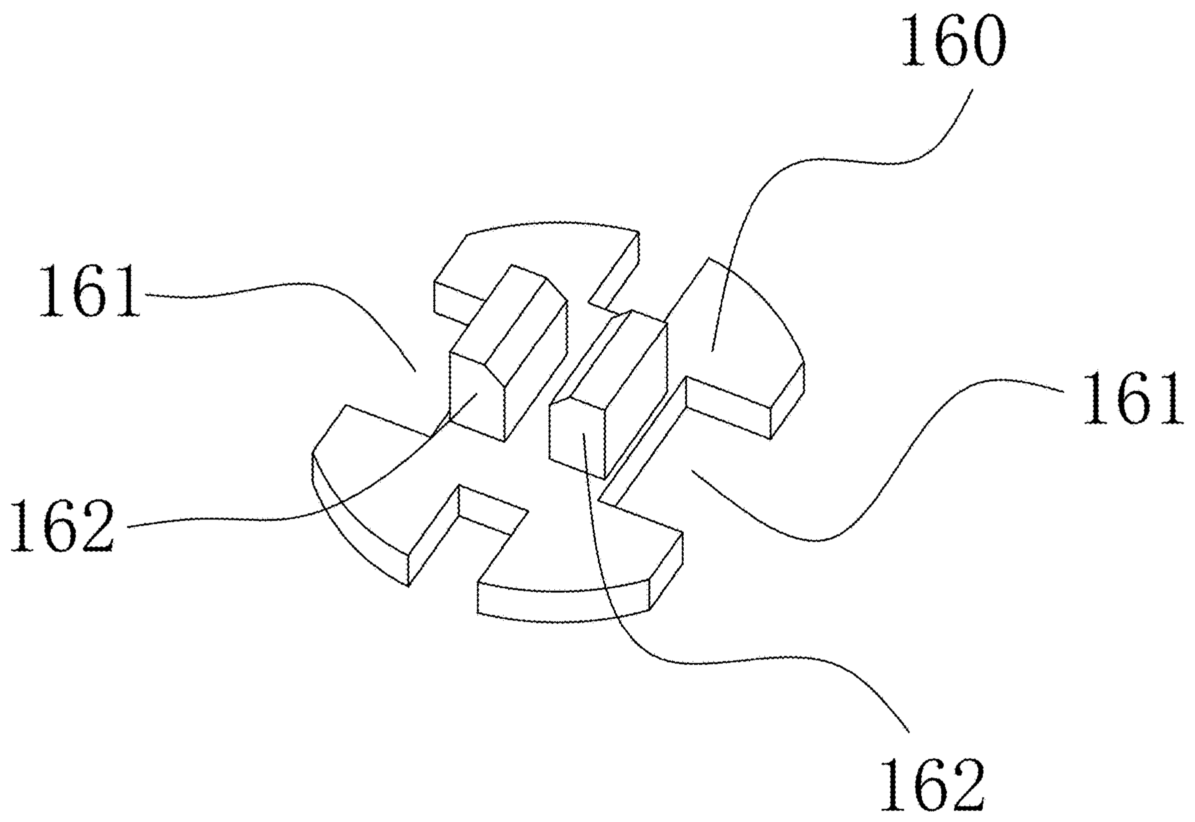
FIG. 19 is a schematic perspective diagram of the limiting plate in the electric connecting part provided by the sixth variant embodiment of the present disclosure.
Figure 20:
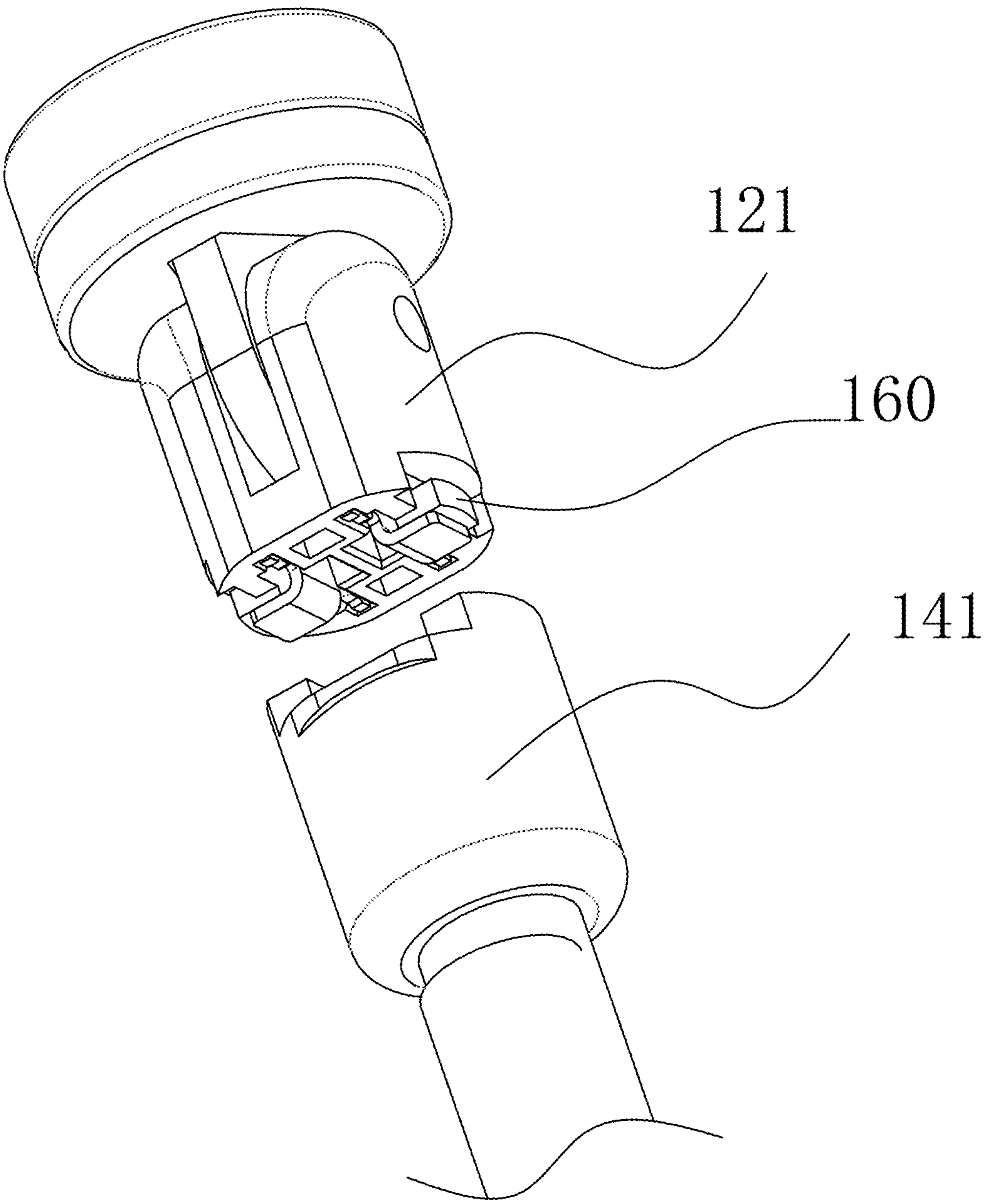
FIG. 20 is a schematic diagram showing the cooperation of the electric connecting part and a second connecting part provided by the sixth variant embodiment of the present disclosure.

Referring to FIG. 18, FIG. 19 and FIG. 20, in some embodiments, the Data cable 100 further includes a limiting plate 160. The limiting plate 160 is in a circular shape and has two limiting openings 161 at opposite edges. A part of the limiting plate 160 close to the center of the circle protrudes toward the rotating shaft 130 to form two fixing blocks 162, and the two fixing blocks 162 are perpendicular to the limiting plate 160. The shapes of the two limiting openings 161 are matched with the first contact plate 1227 and the second contact plate 1237 in shape. The first contact plate 1227 and the second contact plate 1237 are respectively arranged in the two limiting openings 161. The limiting openings 161 can function to limit the positions of the first contact plate 1227 and the second contact plate 1237. In addition, the first contact plate 1227 and the second contact plate 1237 are in contact with one sides of the two fixing blocks 162 away from the circle center of the limiting plate 160, respectively, and may function to limit and fix the first contact plate 1227 and the second contact plate 1237. The limiting plate 160 is fixedly connected to the fixed seat 141. The connection manner of the limiting plate 160 and the fixed seat 141 includes, but is not limited to, integral injection molding, gluing, or clamping.

The first contact plate 1227 and the second contact plate 1237 are electrically connected to the line body 140. The connection manner of the first contact plate 1227 and the second contact plate 1237 to the line body 140 includes, but is not limited to, SMT patch, welding or elastic contact. Alternatively, in some other embodiments, the Data cable further includes a connecting plate. The connecting plate functions to electrically connect the line body 140 with the first contact plate 1227 and the second contact plate 1237. In this way, it is more convenient for the first contact plate 1227 and the second contact plate 1237 to be electrically connected to the connecting plate by SMT or welding.

Meanwhile, the first contact plate 1227 and the second contact plate 1237 are bent, which greatly shortens the first conducting connection sheet 122 and the second conducting connection sheet 123 and reduces the size of the second connecting part 120.

Referring to FIG. 20, the limiting plate 160 is arranged inside one end of the fixed core away from the adapter plate 114.

Figure 21:
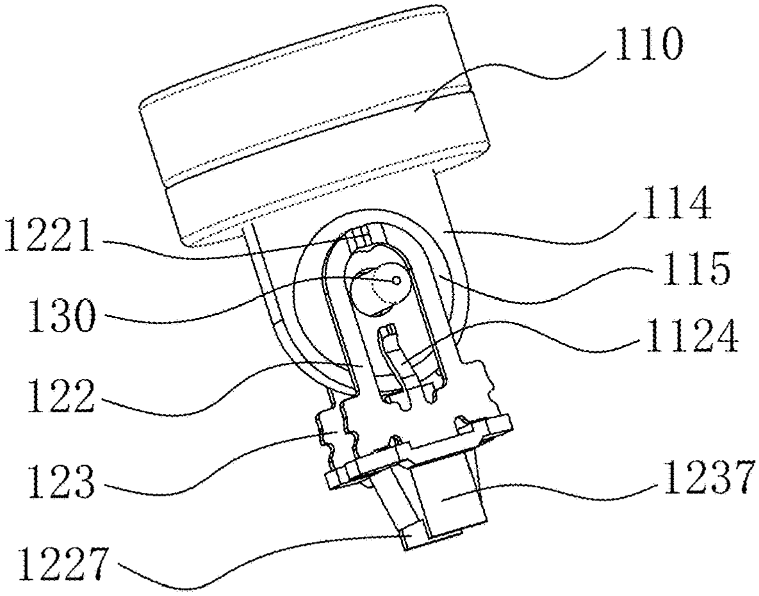
FIG. 21 is a schematic structural diagram of a first conducting connection sheet in a second connecting part provided by a seventh variant embodiment of the present disclosure.
Figure 22:
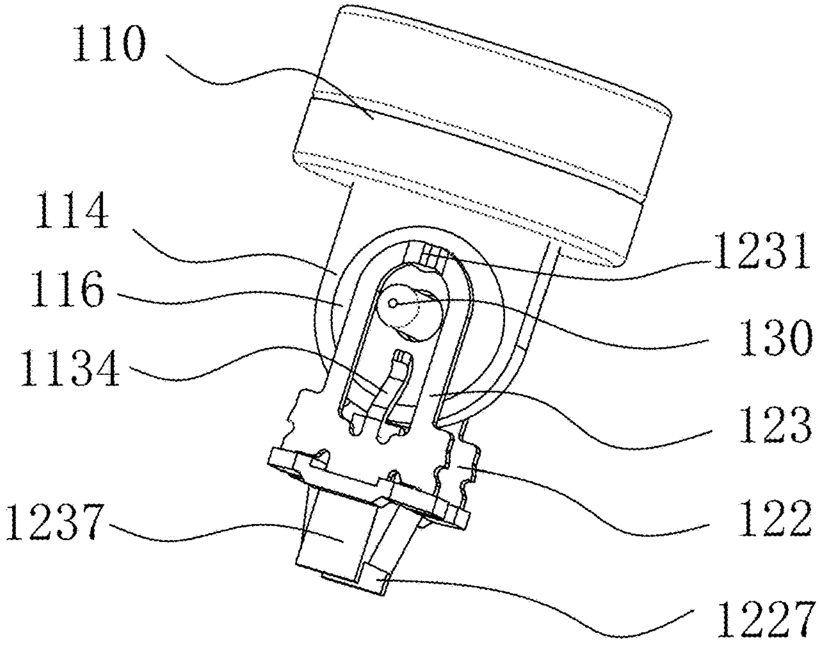
FIG. 22 is a schematic structural diagram of a second conducting connection sheet of the second connecting part provided by the seventh variant embodiment of the present disclosure.

Referring to FIG. 21 and FIG. 22, in a seventh variant embodiment, one end of the edge at the hollowed part of the first conducting connection sheet 122 away from the first electric brush 1221 protrudes to form a first middle electric brush 1224. One end of the edge at the hollowed part of the second conducting connection sheet 123 away from the second electric brush 1231 protrudes to form a second middle electric brush 1234. The first middle electric brush 1224 and the second middle electric brush 1234 are in slidable contact with and electrically connected to the conducting sheets 115 on two side surfaces of the adapter plate 114 respectively. In this way, contact points between the first conducting connection sheet 122 and the conducting sheet 115, and between the second conducting connection sheet 123 and the conducting sheet 115 may be increased to prevent the first conducting connection sheet 122 and the second conducting connection sheet 123 from being out of the contact with the conducting sheet 115.

Figure 23:
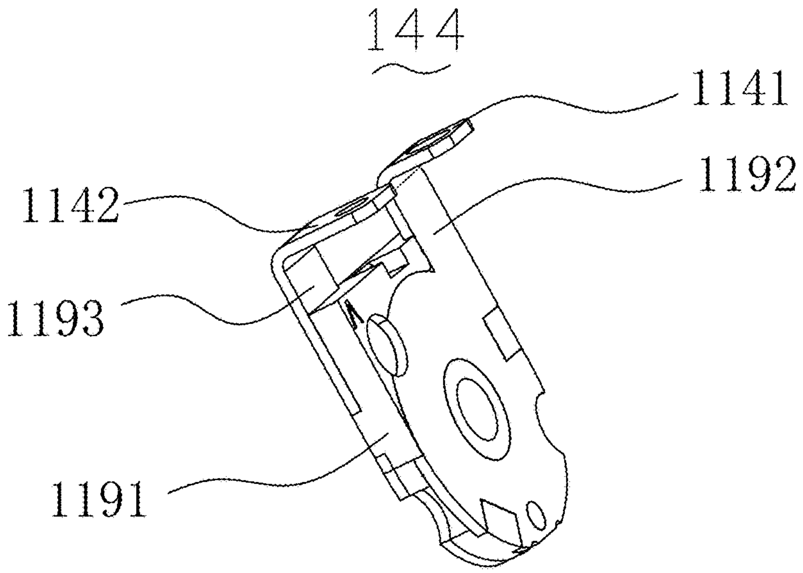
FIG. 23 is a schematic perspective diagram of an adapter plate provided by an eighth variant embodiment of the present disclosure.
Figure 24:
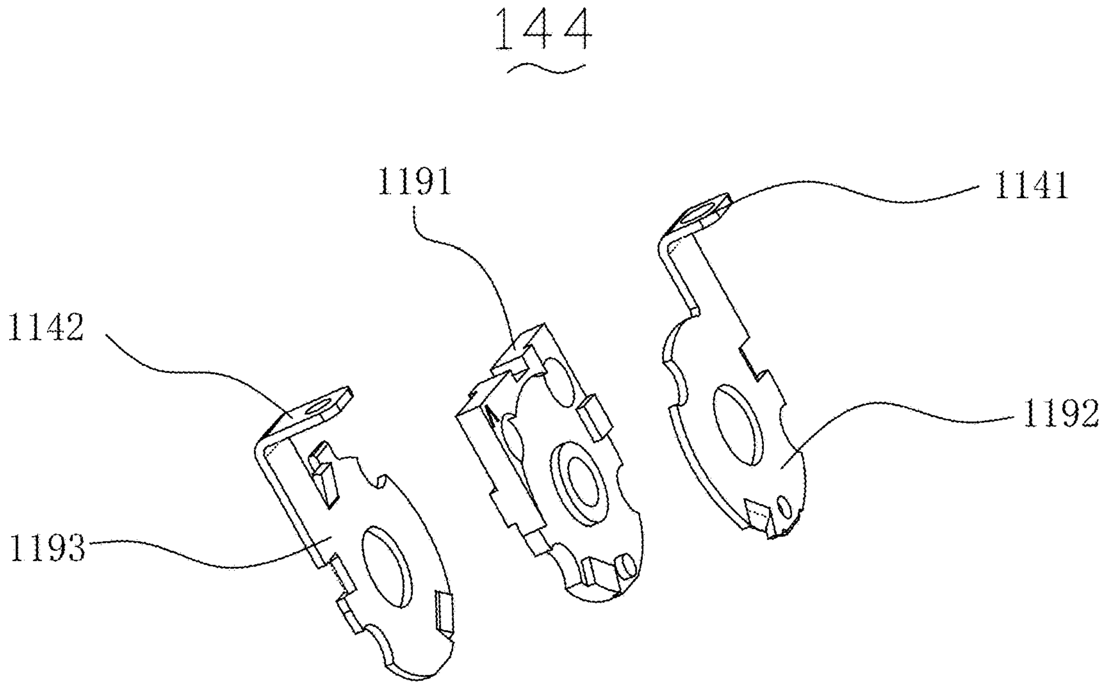
FIG. 24 is an exploded schematic diagram of the adapter plate provided by the eighth variant embodiment of the present disclosure.

Referring to FIG. 23 and FIG. 24, in an eighth variant embodiment of the Data cable 100 provided by the present disclosure, the adapter plate 114 includes an adapter plate body 1191, a first lateral conductive sheet 1192 and a second lateral conductive sheet 1193. The conducting sheet 115 is of a prefabricated sheet-like structure, wherein one end of the conducting sheet 115 extends by a length and is bent to form a conducting connection pin 1141. The conducting sheet 115 includes the first lateral conductive sheet 1192 and the second lateral conductive sheet 1193. The overall contour of one end of the adapter plate body 1191 is semicircular. One end of the first lateral conductive sheet 1192 is bent at 90 degrees to form the conducting connection pin 1141, and one end of the second lateral conductive sheet 1193 is bent at 90 degrees to form the conducting connection pin 1141. The first lateral conductive sheet 1192 and the second lateral conductive sheet 1193 are respectively fixedly attached to two sides of the adapter plate body 1191.

The foregoing descriptions are merely preferred embodiments of the present disclosure, and are not intended to limit the present disclosure. Within the principles of the present disclosure, any modifications, equivalent substitutions, improvements, etc., are within the protection scope of the present disclosure.

The invention claimed is:

1. An electric connecting part, wherein the electric connecting part comprising an adapter plate and a terminal head, the adapter plate is electrically connected to the terminal head, conducting sheets are arranged on the adapter plate, the conducting sheets are electrically connected to the terminal head, the conduction sheets are used to receive external signals, each conduction sheet includes an arc-shaped structure, the adapter plate includes two main surfaces arranged opposite to each other, the conducting sheets are arranged on one main surface or on the two main surfaces of the adapter plate, the arc-shaped structure of the conduction sheets is used to enable rotation of a second connecting part relative to the adapter plate equal to or less than 180 degrees, wherein the adapter plate comprises an adapter section and a connecting section, when the terminal head is configured to plug into a socket of an electronic device, and the terminal head is a lightning plug, the terminal head comprises a first housing and a metal needle; the first housing is provided with a cavity for accommodating the metal needle and a window for allowing the metal needle to be exposed; the adapter plate further comprises a plug-in section connected to one side of the connecting section away from the adapter section, wherein the plug-in section extends into the cavity and is electrically connected to the metal needle; or when the terminal head is configured to plug into a socket of an electronic device, the terminal head is a micro-usb plug, the terminal head comprises a second housing for accommodating the metal needle, wherein one end of the metal needle extends out of the second housing and is electrically connected to the connecting section, and the other end of the metal needle is electrically connected to the electronic device; or when the terminal head is configured to plug into a socket of an electronic device, the terminal head is a type-c plug, the terminal head comprises a third housing for accommodating the metal needle, wherein one end of the metal needle extends out of the third housing and is electrically connected to the connecting section, and the other end of the metal needle is electrically connected to the electronic device; or when the terminal head is configured to be connected to a plug in a magnetic attractable manner; the terminal head further comprises a magnetic member which is of an annular structure; the magnetic member is configured to be connected to the plug in a magnetic attractable manner.

2. The electric connecting part according to claim 1, wherein the adapter plate includes an arc-shaped structure, the arc-shaped structure of the adapter plate is the same as or corresponds to the arc-shaped of the conduction sheets.

3. The electric connecting part according to claim 1, wherein the conducting sheets comprises at least two conducting sheets, when the number of the conducting sheets on one main surface is greater than or equal to two, the conducting sheets are arranged in a form of a concentric ring or arc.

4. The electric connecting part according to claim 1, wherein a width of the adapter section is less than a width of the connecting section; the adapter plate is of a "T"-shaped structure.

5. The electric connecting part according to claim 1, wherein when the terminal head is configured to be connected to the plug in a magnetic attractable manner, the terminal head comprises at least one conducting needles which is electrically connected to the respective conducting sheets, the conducting needles are arranged in the magnetic member, the terminal head further comprises a conducting connection plate; the conducting needles are electrically connected to the conducting connection plate.

6. The electric connecting part according to claim 5, wherein at least two conducting connection pins are arranged at one end of the adapter plate away from a rotating shaft, one of the conducting connection pins is electrically connected to one conducting sheet on one main surface and the magnetic member, and the other conducting connection pins are electrically connected to the other conducting sheets and the conducting connection plate.

7. The electric connecting part according to claim 6, wherein the number of the conducting needles is set to five or more, the two main surfaces of the adapter plate are defined as a front surface and a back surface, there are two or three conducting sheets on the each of the front and back surfaces.

8. The electric connecting part according to claim 6, wherein the conducting needles are arranged at equal intervals.

9. The electric connecting part according to claim 1, wherein the adapter plate comprises an adapter plate body which is of a rigid structure; the conducting sheets are printed on the adapter plate body; conducting connection pins are arranged on the adapter plate body; or each conducting sheet is of a prefabricated sheet-like structure, one end of which extends by a length and is bent to form conducting connection pin, the conducting connection pin is electrically connected the terminal head.

10. A data cable, wherein comprising the second connecting part and the electric connecting part in one of the claim 1, the second connecting part is configured to be connected to a line body; the second connecting part comprises a fixed core, and at least one first conducting connection sheet and at least one second conducting connection sheet which are arranged on the fixed core; the fixed core is provided with a through groove for the adapter plate to be inserted; when the adapter plate is rotatably connected to the fixed core through a rotating shaft, the first and second conducting connection sheets are electrically connected to the adapter plate to realize charging and/or data transmission.

11. The data cable according to claim 10, wherein the first conducting connection sheet and the second conducting connection sheet are sheet-like; the first conducting connection sheet and the second conducting connection sheet are hollowed in the middle; and the rotating shaft passes through the middle hollowed areas of the first conducting connection sheet and the second conducting connection sheet.

12. The data cable according to claim 11, wherein one end of the first conducting connection sheet is bent in a direction perpendicular to a sheet-like plane to form the first electric brush; one end of the first conducting connection sheet away from the first electric brush is bent to form a first contact plate, and one end of the second conducting connection sheet is bent in a direction perpendicular to the sheet-like plane to form the second electric brush; one end of the second conducting connection sheet away from the second electric brush is bent to form a second contact plate; and the first electric brush and the second electric brush are electrically connected to the adapter plate.

13. The data cable according to claim 12, wherein one end of an edge at the hollowed area of the first conducting connection sheet away from the first electric brush protrudes to form a first middle electric brush; one end of an edge at the hollowed area of the second conducting connection sheet away from the second electric brush protrudes to form a second middle electric brush; and the first middle electric brush and the second middle electric brush are rotatably connected to the conducting sheets on both side surfaces of the adapter plate, respectively.

* * * * *